US011617203B2

(12) United States Patent
Landis et al.

(10) Patent No.: US 11,617,203 B2
(45) Date of Patent: Mar. 28, 2023

(54) SOUNDING REFERENCE SIGNALS TRIGGERED BY RANDOM ACCESS MESSAGE 2 FOR RANDOM ACCESS MESSAGE 4 QUASI CO-LOCATION

(71) Applicant: QUALCOMM Incorporated, San Diego, CA (US)

(72) Inventors: Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/157,657

(22) Filed: Jan. 25, 2021

(65) Prior Publication Data
US 2022/0240306 A1  Jul. 28, 2022

(51) Int. Cl.
*H04W 74/00* (2009.01)
*H04W 74/08* (2009.01)
*H04W 72/04* (2009.01)
*H04L 25/02* (2006.01)
*H04L 5/00* (2006.01)
*H04W 72/0446* (2023.01)
*H04W 72/044* (2023.01)

(52) U.S. Cl.
CPC ......... *H04W 74/008* (2013.01); *H04L 5/0051* (2013.01); *H04L 25/0226* (2013.01); *H04W 72/046* (2013.01); *H04W 72/0446* (2013.01); *H04W 74/006* (2013.01); *H04W 74/0841* (2013.01)

(58) Field of Classification Search
CPC .......... H04W 74/008; H04W 72/0446; H04W 72/046; H04W 74/006; H04W 74/0841; H04L 5/0051; H04L 25/0226
See application file for complete search history.

(56) References Cited

U.S. PATENT DOCUMENTS

| 2017/0223744 | A1* | 8/2017 | Qian | H04W 74/0833 |
| 2018/0368126 | A1* | 12/2018 | Islam | H04L 5/0053 |
| 2019/0159264 | A1* | 5/2019 | Zhang | H04W 72/046 |
| 2020/0204316 | A1* | 6/2020 | Zhang | H04B 1/713 |
| 2021/0144723 | A1* | 5/2021 | Takahashi | H04W 74/006 |
| 2022/0046716 | A1* | 2/2022 | Chai | H04B 7/088 |
| 2022/0225389 | A1* | 7/2022 | Go | H04B 7/002 |

* cited by examiner

*Primary Examiner* — Chae S Lee
(74) *Attorney, Agent, or Firm* — Arent Fox, LLP

(57) ABSTRACT

Apparatus, methods, and computer-readable media for sounding reference signals (SRSs) triggered by random access channel (RACH) message 2 for RACH message 4 physical downlink shared channel quasi co-location (QCL) are disclosed herein. A user equipment (UE) may transmit, to a base station via a transmit beam over a random access channel, a random access preamble and receive a random access response based on the random access preamble. The UE may transmit, to the base station via a plurality of transmit sub-beams, a plurality of SRS transmissions triggered by the random access response. The UE can receive, from the base station, a downlink control signal that includes an SRS resource indicator (SRI) that indicates a selected transmit sub-beam for a corresponding SRS transmission. The UE can use the SRI as QCL information for improved reception of downlink signaling with a refined receive sub-beam corresponding to the selected transmit sub-beam.

30 Claims, 11 Drawing Sheets

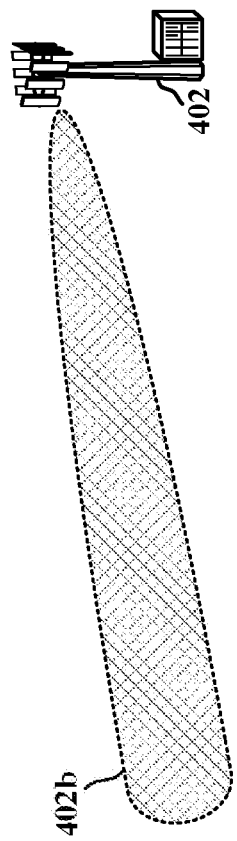
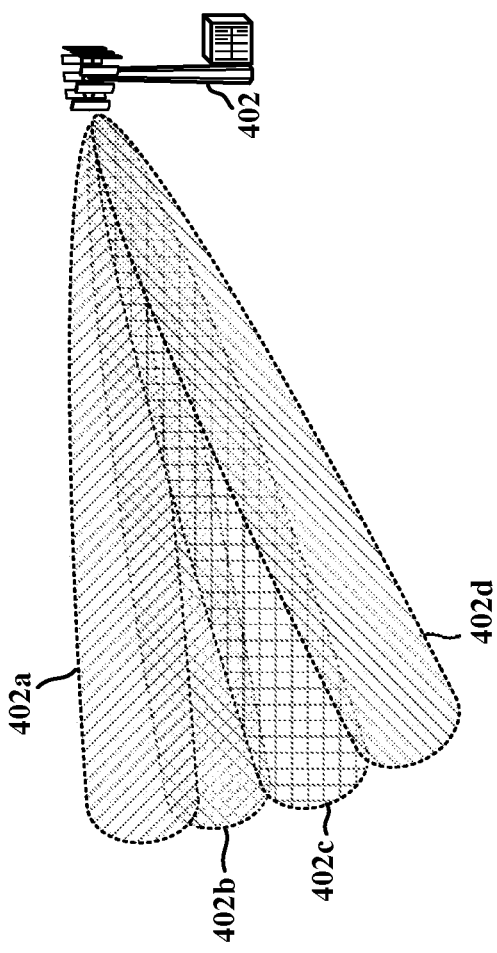
FIG. 4A
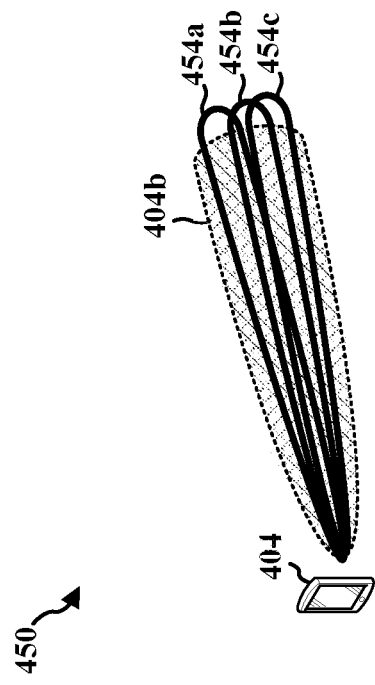
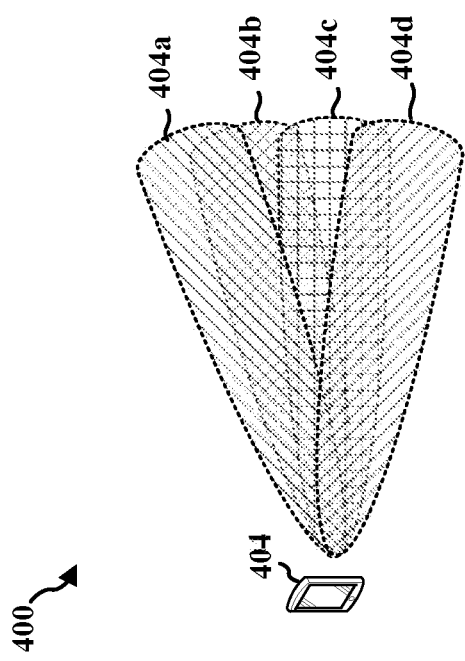
FIG. 4B

SOUNDING REFERENCE SIGNALS TRIGGERED BY RANDOM ACCESS MESSAGE 2 FOR RANDOM ACCESS MESSAGE 4 QUASI CO-LOCATION

BACKGROUND

Technical Field

The present disclosure relates generally to wireless communication, and more particularly, to techniques for sounding reference signals (SRSs) triggered by random access channel (RACH) message 2 for RACH message 4 physical downlink shared channel (PDSCH) quasi co-location (QCL).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency-division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). These improvements may also be applicable to other multi-access technologies and the telecommunication standards that employ these technologies.

In particular, wireless communication may include a random access procedure that allows a user equipment (UE) to initiate or resume communications with a base station. Under certain channel conditions, various messages of the random access procedure may not be received correctly, which may delay or prevent the UE from connecting to the base station. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a random access channel procedure, under some channel conditions, transmitted messages may not be received correctly. In particular, when high carrier frequencies are utilized, transmissions may be subject to high path loss. For example, the RACH procedure is one of the limiting factors for coverage of 5G service at mm-wave frequencies and at high frequency bands (e.g., Frequency Range 4 (FR4), Frequency Range 5 (FR5)). Beamforming between a UE and a base station may overcome the path loss experienced at high carrier frequencies. During a RACH procedure, however, beamforming between the UE and the base station may not be established properly, for example, because the coverage between the UE and the base station may be less than optimal prior to the RACH procedure. In this regard, it would be desirable to enhance the coverage between the UE and the base station during the RACH procedure. Since it is desirable to enhance the coverage, it would be useful to refine the UE transmit beams to enhance the receiver coverage at the base station as well as refine the UE receiver beams to enhance the receiver coverage at the UE.

The present disclosure addresses at least the coverage problem with RACH procedures by utilizing a series of sounding reference signals (SRSs), which can help improve the beam refinement at both the UE and the base station during the RACH procedure. In a RACH scenario, the SRS transmissions may be triggered by a RACH message 2 (or RACH response) issued by the base station. The RACH message 2 triggered SRS can be used to improve base station beam refinement as well as improve UE beam refinement assuming reciprocity. In this regard, the present disclosure provides for the RACH message 2 to trigger transmission of multiple SRS by the UE, where each SRS is transmitted on a symbol with a different beam. For example, each SRS can be transmitted on a different orthogonal frequency-division multiplexing (OFDM) symbol with a different spatial filter to provide the SRS beam a separate beam direction toward the base station. The multiple SRS symbols can cover the original beam width of the beam used to transmit a RACH message 1 (or RACH preamble) in the RACH procedure. The subject technology can allow the base station to select the best measured UE beam based on the SRS symbols with narrower beams. The base station can return an SRS resource indicator (SRI) to the UE. The SRI can serve as a notification to the UE that indicates which SRS beam was best among the multiple SRS beams. The base station may provide the SRI within a physical downlink control channel (PDCCH) of a of a RACH message 4. The UE can utilize the SRI (e.g., by using the SRS beam indicated in the PDCCH of the RACH message 4) to define the QCL for downlink reception of the PDSCH in the RACH message 4 and/or subsequent PDCCH/PDSCH transmissions.

Particular implementations of the subject matter described in this disclosure can be implemented to realize one or more of the following potential advantages. In some implementations, the described techniques can be used to improve reliability of the RACH procedure, and thus, facilitate access to a wireless network and establish a communication connection between a UE and a base station. For example, the subject technology can improve beam refinement at the UE and base station by SRS signaling triggered with RACH message 2 signaling, which can allow the UE to utilize narrower receive beams based on SRI information in the RACH message 4 PDCCH to achieve better coverage between the UE and the base station and provide initial link stability.

In an aspect of the disclosure, a method, a computer-readable medium, and an apparatus are provided. The apparatus may be a UE. The apparatus is configured to communicate, with a base station via a transmit beam over a random access channel, a random access preamble. The apparatus is also configured to receive, from the base station over the random access channel, a random access response based on the random access preamble. The apparatus is also configured to communicate, with the base station via a plurality of transmit sub-beams, a plurality of SRS transmissions based on the random access response. The apparatus is also configured to receive, from the base station, a downlink control signal that includes an SRI that indicates a selected transmit sub-beam in the plurality of transmit sub-beams that is associated with a corresponding SRS transmission in the plurality of SRS transmissions. The apparatus is also configured to determine quasi co-location QCL information from the SRI, the QCL information indicating that downlink signaling of the base station is quasi co-located with the corresponding SRS transmission. The apparatus is also configured to receive, from the base station via a refined receive sub-beam, the downlink signaling based on the QCL information, the refined receive sub-beam corresponding to the selected transmit sub-beam.

In an aspect of the disclosure, a method, a computer-readable medium, and an apparatus are provided. The apparatus may be a base station. The apparatus is configured to receive, from a UE via an uplink transmit beam over a random access channel, a random access preamble. The apparatus is also configured to communicate, with the UE over the random access channel, a random access response. The apparatus is also configured to receive, from the UE via a plurality of receive beams, a plurality of SRS transmissions on a plurality of uplink transmit sub-beams based on the random access response. The apparatus is also configured to obtain one or more measurements of each of the plurality of uplink transmit sub-beams by a beam sweep operation with the plurality of receive beams. The apparatus is also configured to elect one of the plurality of uplink transmit sub-beams based on the one or more measurements. The apparatus is also configured to communicate, with the UE, a downlink control signal that includes an SRI that indicates the selected one of the plurality of uplink transmit sub-beams that is associated with a corresponding SRS transmission in the plurality of SRS transmissions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B are diagrams illustrating a base station in communication with a UE, in accordance with some aspects of the present disclosure.

DETAILED DESCRIPTION

Figure 1:
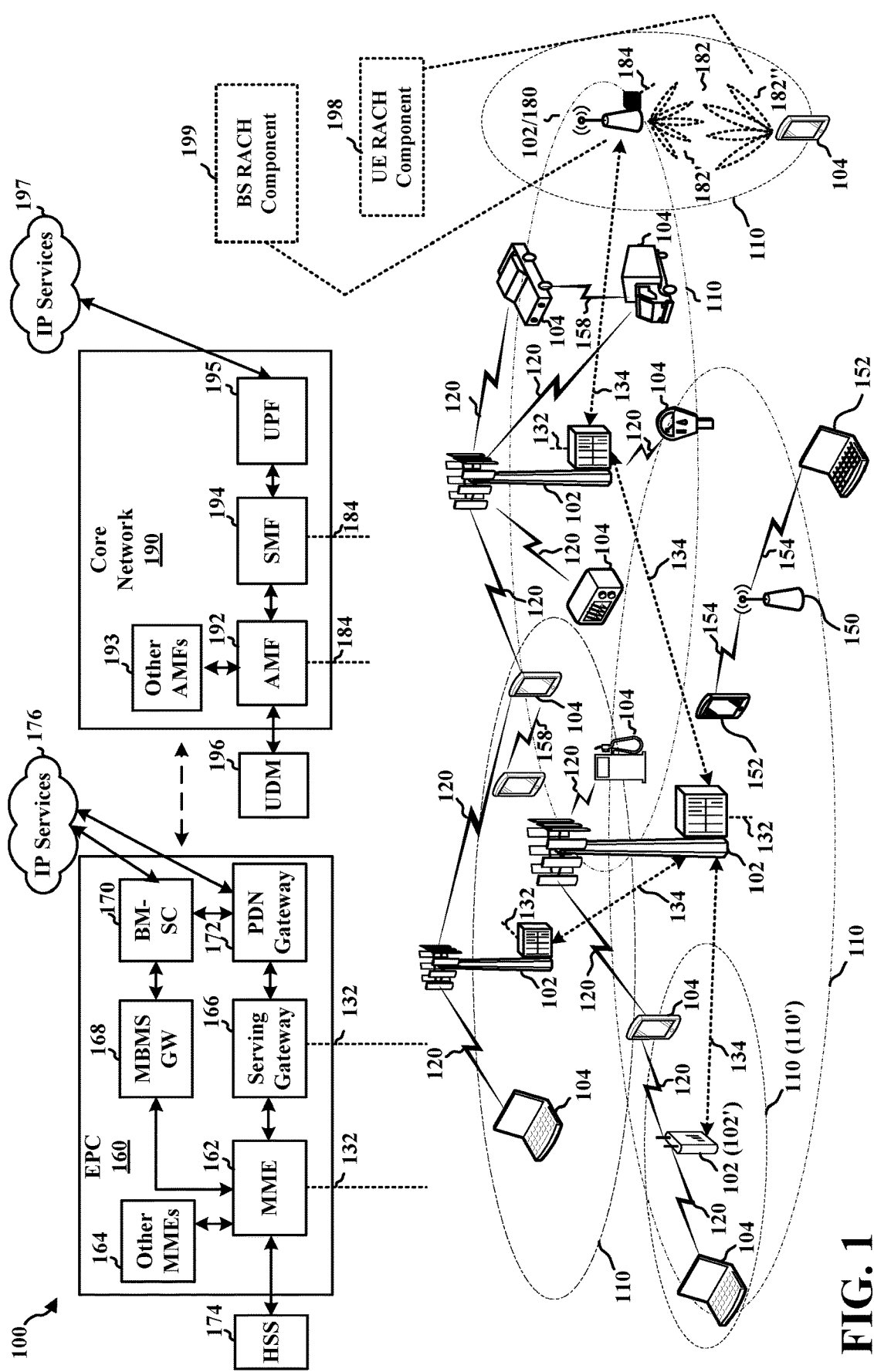
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In a RACH procedure, under some channel conditions, transmitted messages may not be received correctly. In particular, when high carrier frequencies are utilized, transmissions may be subject to high path loss. For example, the RACH procedure is one of the limiting factors for coverage of 5G service at mm-wave frequencies and at high frequency bands (e.g., FR4, FR5). Beamforming between the UE and the base station may overcome the path loss experienced at high carrier frequencies. During a RACH procedure, however, beamforming between the UE and the base station may not be established properly, for example, because the coverage between the UE and the base station may be less than optimal prior to the RACH procedure. In this regard, it would be desirable to enhance the coverage between the UE and the base station during the RACH procedure. Since it is desirable to enhance the coverage, it would be useful to refine the UE transmit beams to enhance the receiver coverage at the base station as well as refine the UE receiver beams to enhance the receiver coverage at the UE.

The present disclosure addresses at least the coverage problem with RACH procedures by utilizing a series of SRSs, which can help improve the beam refinement at both the UE and the base station during the RACH procedure. In a RACH scenario, the SRS transmissions may be triggered by a RACH Msg 2 issued by the base station. The RACH Msg 2-triggered SRS can be used to improve base station beam refinement as well as improve UE beam refinement assuming reciprocity. In this regard, the present disclosure provides for the RACH Msg 2 to trigger transmission of multiple SRS by the UE, where each SRS is transmitted on a symbol with a different beam. For example, each SRS can be transmitted on a different orthogonal frequency-division multiplexing (OFDM) symbol with a different spatial filter to provide the SRS beam a separate beam direction toward the base station. The multiple SRS symbols can cover the original beam width of the beam used to transmit a RACH Msg 1 (or RACH preamble) in the RACH procedure. The subject technology can allow the base station to select the best measured UE beam based on the SRS symbols with narrower beams. The base station can return SRI to the UE. The SRI can serve as a notification to the UE that indicates which SRS beam was best among the multiple SRS beams. The base station may provide the SRI within a PDCCH of a of a RACH Msg 4. The UE can utilize the SRI (e.g., by using the SRS beam indicated in the PDCCH of the RACH Msg 4) to define the QCL for downlink reception of the PDSCH in the RACH Msg 4 and/or subsequent PDCCH/PDSCH transmissions.

Referring again to FIG. 1, in certain aspects, the UE 104 may include an UE RACH component 198 may receive a random access response (RAR) message (referred to as a "RACH Msg 2") that includes a PDCCH portion and a PDSCH portion. In an aspect, one or more of the UEs 104 may include a UE RACH component 198 configured to perform a RACH procedure including transmitting multiple SRSs that are triggered based on the RAR message for beam refinement at the UE 104 and BS 102/180. The UE RACH component 198 may generate and provide, for transmission, multiple SRSs on different symbols with different spatial filters. The UE RACH component 198 also may receive a random access message 4. The UE RACH component 198 may obtain an SRI in the PDCCH portion of the random access message 4. The SRI may be used by the UE RACH component 198 to select a refined receive beam for improved reception of PDCCH/PDSCH signaling.

Referring still to FIG. 1, in certain aspects, the base station 102/180 may include a BS RACH component 199 that triggers transmission of the multiple SRSs from the UE 104 via the RACH Msg 2 for beam refinement at the UE 104 and BS 102/180. The BS RACH component 199 may transmit the RACH Msg 2 including a PDCCH portion and a PDSCH portion. The PDCCH portion may include control signaling that indicates a trigger condition at the UE 104 to transmit the multiple SRSs on different symbols with different beams (e.g., at different transmit directions based on different spatial filters). The BS RACH component 199 may receive multiple SRS transmissions from the UE 104 based on the RACH Msg 2. The BS RACH component 199 may select which of the SRS transmissions has the best measured beam. The BS RACH component 199 may transmit the SRI within the PDCCH of a random access message 4 to indicate to the UE 104 as to which of the SRS beams was determined as the best measured SRS beam for beam refinement at the UE 104. The BSs 102/180 may transmit the PDSCH within the RACH Msg 4, in which the ports used to transmit the PDCCH are quasi co-located with the ports used to transmit the PDSCH.

Although the following description may be focused on 5G NR, the concepts described herein may be applicable to other similar areas, such as LTE, LTE-A, CDMA, GSM, and other wireless technologies.

Figure 2:
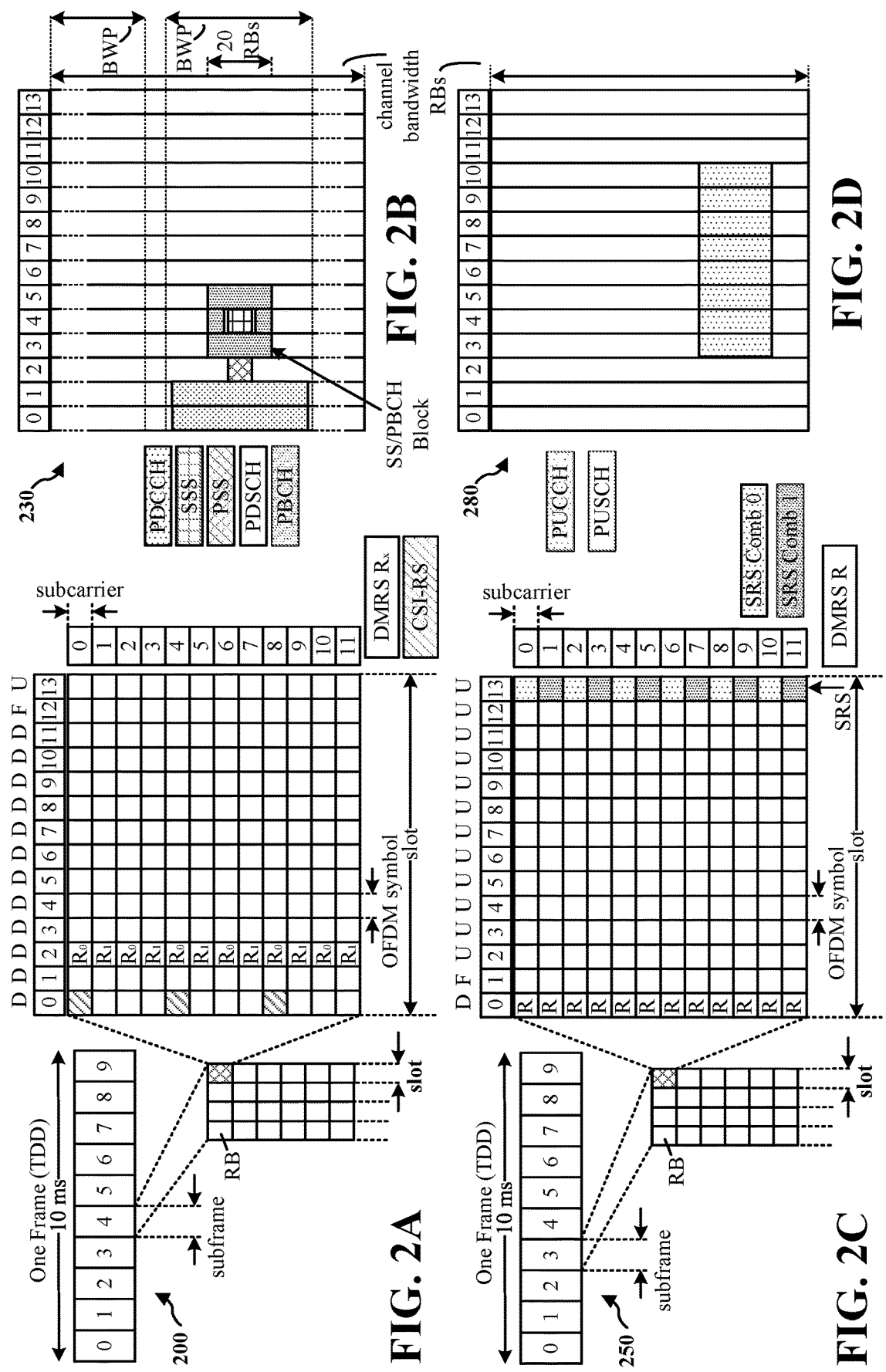
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

As described above, the SRS transmissions may be triggered by a RACH Msg 2 issued by the base station. The RACH Msg 2-triggered SRS can be used to improve base station beam refinement as well as improve UE beam refinement assuming reciprocity. In this regard, the present disclosure provides for the RACH Msg 2 to trigger transmission of multiple SRS by the UE, where each SRS is transmitted on a symbol with a different beam. For example, each SRS can be transmitted on a different orthogonal frequency-division multiplexing (OFDM) symbol with a different spatial filter to provide the SRS beam a separate beam direction toward the base station. The multiple SRS symbols can cover the original beam width of the beam used to transmit a RACH Msg 1 (or RACH preamble) in the RACH procedure. The subject technology can allow the base station to select the best measured UE beam based on the SRS symbols with narrower beams. The base station can return SRI to the UE. The SRI can serve as a notification to the UE that indicates which SRS beam was best among the multiple SRS beams. The base station may provide the SRI within a PDCCH of a of a RACH Msg 4. The UE can utilize the SRI (e.g., by using the SRS beam indicated in the PDCCH of the RACH Msg 4) to define the QCL for downlink reception of the PDSCH in the RACH Msg 4 and/or subsequent PDCCH/PDSCH transmissions.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
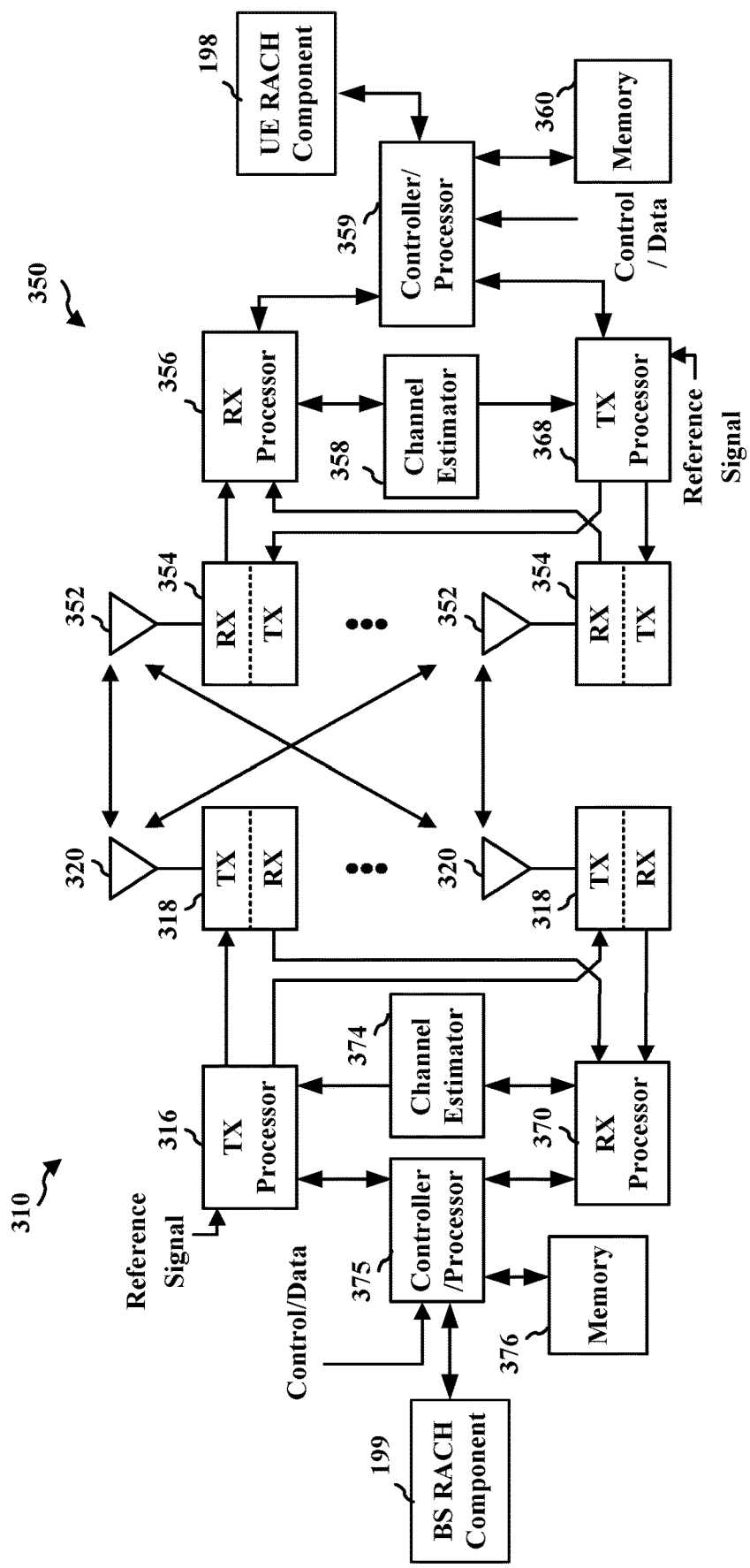
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As described above, the UE RACH component 198 may receive a random access response (RAR) message (referred to as a "RACH Msg 2") that includes a PDCCH portion and a PDSCH portion. In an aspect, one or more of the UEs 104 may include a UE RACH component 198 configured to perform a RACH procedure including transmitting multiple SRSs that are triggered based on the RAR message for beam refinement at the UE 104 and BS 102/180. The UE RACH component 198 may generate and provide, for transmission, multiple SRSs on different symbols with different spatial filters. The UE RACH component 198 also may receive a random access message 4. The UE RACH component 198 may obtain an SRI in the PDCCH portion of the random access message 4. The SRI may be used by the UE RACH component 198 to select a refined receive beam for improved reception of PDCCH/PDSCH signaling.

At least one of the TX processor 368, the RX processor 356, and the controller/processor 359 may be configured to perform aspects in connection with 198 of FIG. 1.

As described above, the BS RACH component 199 may trigger transmission of the multiple SRSs from the UE 104 via the RACH Msg 2 for beam refinement at the UE 104 and BS 102/180. The BS RACH component 199 may transmit the RACH Msg 2 including a PDCCH portion and a PDSCH portion. The PDCCH portion may include control signaling that indicates a trigger condition at the UE 104 to transmit the multiple SRSs on different symbols with different beams (e.g., at different transmit directions based on different spatial filters). The BS RACH component 199 may receive multiple SRS transmissions from the UE 104 based on the RACH Msg 2. The BS RACH component 199 may select which of the SRS transmissions has the best measured beam. The BS RACH component 199 may transmit the SRI within the PDCCH of a random access message 4 to indicate to the UE 104 as to which of the SRS beams was determined as the best measured SRS beam for beam refinement at the UE 104. The BSs 102/180 may transmit the PDSCH within the RACH Msg 4, in which the ports used to transmit the PDCCH are quasi co-located with the ports used to transmit the PDSCH.

At least one of the TX processor 316, the RX processor 370, and the controller/processor 375 may be configured to perform aspects in connection with 199 of FIG. 1.

FIGS. 4A and 4B are diagrams illustrating a base station 402 in communication with a UE 404. Referring to diagram 400 in FIG. 4A, the base station 402 may transmit a beamformed signal to the UE 404 in one or more of beam directions 402a, 402b, 402c, 402d. The UE 404 may receive the beamformed signal from the base station 402 via one or more beam directions 404a, 404b, 404c, 404d.

Referring to diagram 450 in FIG. 4B, the UE 404 may also transmit a beamformed signal to the base station 402 in a selected transmit direction that corresponds to a select beam direction (e.g., 404b). The base station 402 may receive the beamformed signal from the UE 404 in a selected receive direction that corresponds to a select beam direction (e.g., 402b). The base station 402/UE 404 may perform beam management to determine the best receive and transmit directions for each of the base station 402/UE 404 by having the base station 402 trigger the transmission of multiple SRSs at the UE 404 in response to a RACH message 2 from the base station 402. For example, the UE 404 may transmit the multiple SRSs via respective transmit sub-beams 454a, 454b, 454c. Each of the transmit sub-beams 454a, 454b, 454c has a narrower beam width than the beam width of the selected transmit beam (e.g., 404b) of the UE 404 such that the aggregated beam width of the transmit sub-beams 454a, 454b, 454c can cover the beam width of the selected transmit beam. In some implementations, the transmit and receive directions for the base station 402 may or may not be the same. In some implementations, the transmit and receive directions for the UE 404 may or may not be the same.

The multiple SRS transmissions may be located within consecutive symbols of a slot. The UE 404 may transmit n SRS transmissions in a slot. That is, each SRS transmission may include the same SRS. The base station 402 may utilize different refined sub-beams to receive each SRS transmission in the respective symbol. A refined sub-beam may refer to a lower level beam in a hierarchical set of beams. For example, a layer 1 (L1) beam may cover multiple layer 2 (L2) beams, of which each may cover multiple layer 3 (L3) beams. In one or more implementations, the beams corresponding to RACH Msg 1 are L2 beams and each of the different refined sub-beams beams is an L3 beam. The L3 refined beams may be based on an L2 beam used for the RACH Msg 1. That is, the UE 404 may generate different sub-beams of the L2 beam (e.g., transmit sub-beams 454a, 454b, 454c) to attempt to improve reception of the RACH Msg 3 at the base station 402.

In an aspect, the base station 402 may select one of the received SRS transmissions based on one or more criteria. For example, the base station 402 may determine which one of the received SRS transmissions has the strongest signal strength and select that SRS transmission. In a first implementation, the base station 402 may detect each SRS transmission of the RACH Msg 3 separately using a corresponding refined beam for each SRS transmission. That is, the base station 402 may receive a signal for each SRS transmission using a respective refined beam and attempt to decode and measure the SRS based on only the signal received with the respective refined beam. The base station 402 may determine a signal power such as a received signal strength indicator (RSSI) for each SRS transmission. The base station 402 may determine a strongest RSSI and select the SRS beam with the strongest RSSI for determining the SRI.

A network may configure a set of time and frequency resources as RACH occasions, in time and frequency, and RACH preamble indices. A mapping between an SSB and the RACH occasions and preamble indices enable the UE to select an appropriate RACH occasion and preamble index from the set of time and frequency resources in order to convey a particular SSB index to the network. The base station 402 may respond to receipt of a RACH preamble (e.g., RACH Msg 1) with downlink communication based on the indicated SSB index. For example, the base station 402 may transmit a RACH response message (e.g., RACH Msg 2) based on the indicated SSB index.

For contention free random access (CFRA), a network configures a set of dedicated time-frequency RACH occasions and preamble indices corresponding to a subset of SSBs. The network may also configure a threshold for selecting SSB/CSI-RS to perform CFRA. The network provides the combination of a dedicated set of RACH occasions (time and frequency resource) and preamble indices per SSB to the UE 404. Thus, the network provides a set of SSBs, each having a corresponding RACH time/frequency location and RACH preamble index. For contention based random access, the network configures an Reference Signal Received Power (RSRP) threshold for selecting an SSB. The UE 404 measures the RSRP of all detected SSBs. If there are multiple SSBs configured for CFRA that have RSRP measurements satisfying a threshold, the UE 404 can flexibly select one of the multiple SSBs for CFRA preamble transmission. If there is no SSB that is configured for CFRA and having an RSRP over the threshold, the UE 404 can select any SSB. For contention free random access, the UE 404 measures the RSRP of different SSBs and reports the measurements to the network.

After selecting one SSB, the UE 404 uses the corresponding dedicated RACH occasion and preamble index for the selected SSB to transmit a RACH preamble (e.g., RACH Msg 1) to the network using a time and frequency resource and preamble index corresponding to the selected SSB. As the configured resources are dedicated for a particular SSB, the network can identify which UE transmitted the RACH preamble and may respond by transmitting a random access response (e.g., Msg2) to the UE 404 through the selected SSB index.

RACH parameters for CFRA resources may be based, e.g., on a dedicated configuration such as a RACH configuration Information Element (IE) (e.g., RACH-ConfigDedicated IE). The IE may provide information about resources configured for RACH Msg 1, e.g., based on a System Information (SI) request. The RACH configuration information may indicate CFRA resources in time and frequency. The RACH configuration information may indicated CFRA occasions based on RACH resources configured for CFRA and based on an SSB per RACH occasion. CFRA resources may be indicated using an SSB resource list with a corresponding RACH occasion index. A RACH preamble index may also be indicated for each of the list of SSBs. An RSRP threshold may be indicated for selection of the SSB for CFRA. The network may configure the RSRP threshold for use by the UE 404 in selecting SSB for performing CFRA. The UE 404 may measure the RSRP of all detected SSBs, and may determine whether any of the SSBs meet the configured RSRP threshold. If the RSRP for an SSB meets the RSRP threshold, the UE 404 may select the SSB for use in determining a preamble transmission for CFRA. Similar information may be provided for CSI-RS configured for CFRA, e.g., including RACH occasion indexes, RACH preamble indexes, and/or RSRP threshold information for a set of CSI-RS configured for CFRA.

As described, CFRA SSB resources may provide one RACH preamble index and one RACH time/frequency index for each corresponding SSB/CSI-RS. This configuration of the RACH preamble indices and time/frequency resources for RACH corresponding to different SSBs may be indicated by the base station 402 to the UE 404. In order to transmit a RACH based on a received SSB/CSI-RS, the UE 404 selects the corresponding RACH preamble index and one RACH time/frequency resource indicated in the configuration received from the base station 402. This enables the base station 402 to identify the SSB based on the RACH preamble index and time/frequency resource(s) of the received RACH.

In another example, a generic RACH (e.g., RACH-ConfigGeneric IE) configuration may be used to specify the cell specific random-access parameters both for regular random access as well as for beam failure recovery. The configuration may indicate RACH resources in time, e.g., using a PRACH configuration index (such as a prach-ConfigurationIndex), as well as frequency resources for the RACH. The frequency resources for the RACH may indicate whether FDM applies for Msg 1 (e.g., msg1-FDM) and/or a starting frequency for Msg 1 (e.g., msg1-FrequencyStart) for the RACH. Such a generic RACH configuration IE may include a generic RACH configuration for RACH and beam failure recovery, including any of a PRACH configuration index, Msg 1 FDM information, Msg 1 starting frequency information, zero correlation zone configuration information, a target power for receiving a preamble, a transmission maximum for a preamble, power ramping step information, and/or information about a window for receiving a RACH response.

Prior to the RACH procedure 404, the base station 402 may transmit system information such as remaining minimum system information (RMSI) and the UE 404 may receive the system information. The UE 404, however, may not have established a radio resource control (RRC) connection and may not be configured with UE specific parameters.

The UE 404 may use a random access procedure associated with contention based random access (CBRA) in order to communicate with the base station 402. For example, the UE 404 may use the random access procedure to request an RRC connection, to re-establish an RRC connection, resume an RRC connection, etc. A four-step RACH procedure 410 includes the exchange of four messages. Specifically, the UE 404 may initiate the message exchange by sending, to the base station 402, a first RACH message (e.g., Msg 1) including a preamble. The base station 402 responds to the first RACH message by sending a second RACH message (e.g. Msg 2) including a random access response (RAR). Msg 2 may include an identifier of the RACH preamble, a time advance (TA), an uplink grant for the UE to transmit data, cell radio network temporary identifier (C-RNTI), and/or a back-off indicator. Upon receiving the RAR, the UE 404 transmits a third RACH message (e.g., Msg 3) to the base station that may include a RRC connection request, an RRC connection re-establishment request, or an RRC connection resume request, depending on the trigger for the initiating the random access procedure. The base station 402 then completes the four-step RACH procedure by sending a fourth RACH message (e.g., Msg 4). The fourth RACH message may include a RACH response message that includes timing advancement information, contention resolution information, and/or RRC connection setup information.

For CBRA, the network may configure a set of RACH occasions, in time-frequency resources, and preamble indices. The network may allow a cyclic mapping from SSBs to the RACH occasions and preamble indices so that a UE 404 can select an SSB and transmit Msg1 by selecting an appropriate RACH occasion and preamble index from the set of corresponding RACH occasions and preamble indices. The UE 404 conveys the SSB index to the network according to the use of time-frequency resources to send a preamble corresponding to the preamble index for a particular SSB. The network responds to the Msg1 by transmitting a Msg2 through the conveyed SSB index. After the completion of four messages of a four-step RACH procedure, the network may identify the UE 404 that transmitted Msg1 and may establish a connected mode of operation with the UE 404. In some implementations, instead of the network providing a mapping between time/frequency resources for each of the SSBs, the SSBs may be cyclically mapped to a group of time/frequency resources. Thus, a UE selects from among the group of time/frequency resources using the cyclical mapping and conveys the message to the network.

Referring additionally to Table 1 (below), during operation, the UE 404 may execute an implementation of an NR RACH procedure, according to a 4-step NR RACH message flow, due to the occurrence of one or more RACH trigger events. Suitable examples of RACH trigger events may include, but are not limited to: (i) the UE 404 performing an initial access to transition from an RRC_IDLE state to RRC_CONNECTED ACTIVE state; (ii) the UE 404 detecting downlink (DL) data arrival while in an RRC_IDLE state or RRC_CONNECTED INACTIVE state; (iii) the UE 404 determining UL data arrival from higher layers during RRC_IDLE state or RRC_CONNECTED INACTIVE state; (iv) the UE 404 performing a handover from another station to the base station 402 during the connected mode of operation; and (v) the UE performing a connection re-establishment procedure such as a beam failure recovery procedure.

The NR RACH procedure may be associated with a CBRA procedure. In one or more implementations, a contention-based NR RACH procedure may correspond to the following RACH trigger events: an initial access from RRC_IDLE to RRC_CONNECTED ACTIVE; UL data arrival during RRC_IDLE or RRC_CONNECTED INACTIVE; and a connection re-establishment.

On the occurrence of any of the above RACH trigger events, the execution of the NR RACH procedure may include the 4-step NR RACH message flow, where the UE 404 exchanges messages with the base station 402 to gain access to a wireless network and establish a communication connection. The messages may be referred to as random access messages 1 to 4, RACH messages 1 to 4, or may alternatively be referred to by the PHY channel carrying the message, for example, message 3 PUSCH.

TABLE 1

NR RACH procedure, including Messages and Message Content transmitted over corresponding Physical (PHY) channel(s).

| PHY Channel | Message | Message content |
| --- | --- | --- |
| PRACH | Msg 1 | RACH Preamble |
| PDCCH/PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/PDSCH | Msg 4 | Contention resolution message |

As described above, under some channel conditions, transmitted messages may not be received correctly in a RACH procedure. In particular, when high carrier frequencies are utilized, transmissions may be subject to high path loss. For example, the RACH procedure is one of the limiting factors for coverage of 5G service at mm-wave frequencies and at high frequency bands (e.g., FR4, FR5). Beamforming between the UE and a base station may overcome the path loss experienced at high carrier frequencies. During a RACH procedure, however, beamforming between the UE and the base station may not be established properly, for example, because the coverage between the UE and the base station may be less than optimal prior to the RACH procedure.

The present disclosure addresses at least the coverage problem with RACH procedures by utilizing one or more SRSs, which can help improve the beam refinement at both the UE and the base station during the RACH procedure. In a RACH scenario, the SRS transmissions may be triggered by a RACH Msg 2 (or RACH response) issued by the base station. The RACH Msg2-triggered SRS can be used to improve base station beam refinement as well as improve UE beam refinement assuming reciprocity. In this regard, the present disclosure provides for the RACH MSG2 to trigger transmission of multiple SRS by the UE, where each SRS is transmitted on a symbol with a different beam. For example, each SRS can be transmitted on a different OFDM symbol with a different spatial filter to provide the SRS beam a separate beam direction toward the base station. The multiple SRS symbols can cover the original beam width of the beam used to transmit a RACH Msg 1 (or RACH preamble) in the RACH procedure. The subject technology can allow the base station to select the best measured UE beam based on the SRS symbols with narrower beams. The base station can return an SRI to the UE. The SRI can serve as a notification to the UE that indicates which SRS beam was best among the multiple SRS beams. The base station may provide the SRI within a PDCCH of a of a RACH Msg 4. The UE can utilize the SRI (e.g., by using the SRS beam indicated in the PDCCH of the RACH Msg 4) to define the QCL for downlink reception of the PDSCH in the RACH Msg 4 and/or subsequent PDCCH/PDSCH transmissions.

Figure 5:
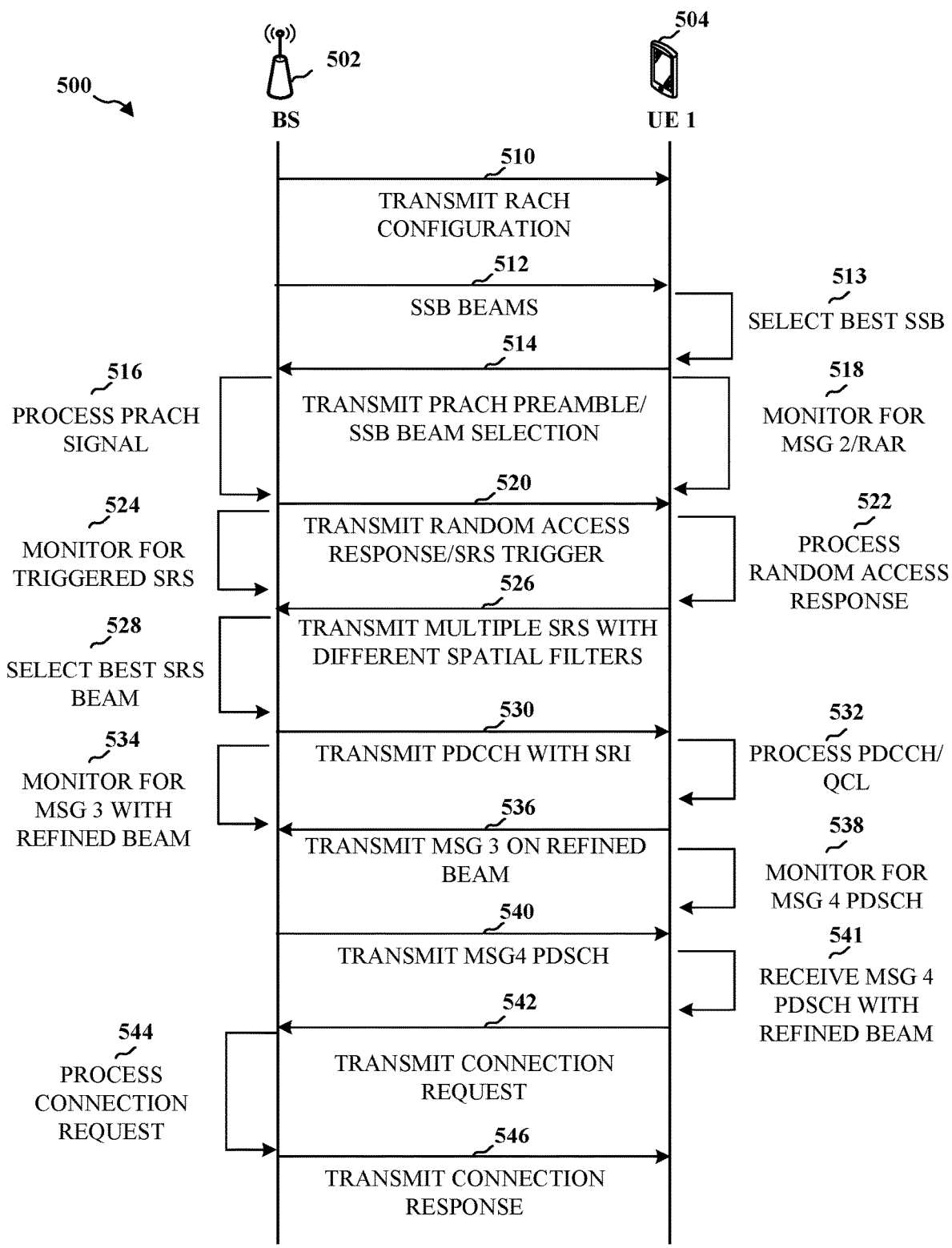
FIG. 5 is a signaling diagram of a random access procedural process 500, in accordance with some aspects of the present disclosure.

FIG. 5 is a signaling diagram of a random access procedural process 500, in accordance with some aspects of the present disclosure. The process 500 may be implemented between a UE 504 and a base station 502 in an access network, in which the UE 504 transmits multiple SRSs in response to a RACH response (e.g., Msg 2) that triggers their transmission for beam refinement at the UE 504 and base station 502 during a RACH procedure. In particular, the Msg2-triggered SRSs can allow the UE 504 to determine quasi co-location information for improved reception of downlink signaling (e.g., PDSCH/PDCCH). This improvement in the RACH procedure allows the base station 502 to select the best UE beam based on SRS symbols with narrower beams (which can occur prior to RACH Msg 3 or during a slot of the RACH Msg 3). The base station 502 can notify the UE 04 in PDCCH portion of RACH Msg 3 of which SRS narrow beam was the best one via SRI signaling, thus allowing to use the SRI as the QCL Type-D for downlink. This improvement in coverage can be provided for improved reception of the RACH Msg 4 PDSCH portion and with the first PDSCH messages. This improvement in the RACH procedure includes the advantage of using narrower receive beams at the UE 504 for increasing the reception coverage of the RACH Msg 4 PDSCH and increasing initial link stability. The subject technology also allows beam refinement by SRS triggered RACH Msg 2 at both the UE 504 and the base station 502. The improvement in the RACH procedure of the present disclosure represents a faster opportunity for a UE to refine its beams using the ones used for SSB selection.

The BS 502 may be similar to the BSs 102, 180, 310 and 502. The UE may be similar to the UEs 104, 350 and 504. The process 500 can be executed by computing devices (e.g., a processor, processing circuit, and/or other suitable component) of the BS 102/180 and the UE 104. As illustrated, the process 500 includes a number of enumerated steps, but implementations of the process 500 may include additional steps before, after, and in between the enumerated steps. In some implementations, one or more of the enumerated steps may be omitted or performed in a different order.

At 510, the base station 502 may transmit a RACH configuration that configures the UE 504 for RACH based on configurable RACH parameters. The RACH configuration may indicate a predetermined threshold for comparing measured SSBs at the UE 504. The RACH configuration also may indicate a scaling factor for beam shaping of uplink transmit beams during the RACH procedure (e.g., radiating narrower beams). In some aspects, the base station 502 may indicate a cell ID or a frequency range for the SSB to which the RACH parameters apply.

At 512, the UE 504 receives at least one SSB of a burst of SSBs on different beams with respective spatial filters.

At 513, the UE 504 selects an SSB for which the UE 504 can transmit a RACH message, e.g., a RACH preamble or RACH Msg 1. In some aspects, the UE 504 may scan the burst of SSBs and select the SSB with the best measured beam.

At 514, the UE 504 transmits a RACH Msg 1. In a first step of the RACH procedure, for example, UE 504 may transmit a message (RACH Msg 1), which may be referred to as a random access request message, to the base station 502 via a physical channel, such as a physical random access channel (PRACH). For example, RACH Msg 1 may include one or more of a RACH preamble and a resource requirement. The UE 504 may transmit the RACH Msg 1 on a random access opportunity (RO). In an aspect, the RACH preamble may be a relatively long preamble sequence, which may be easier for the base station 502 to receive than an OFDM symbol. In an aspect, the UE 504 may select a beam for transmission of the RACH Msg 1 based on received SSBs transmitted by the base station 502. In some aspects, the RACH Msg 1 is transmitted using the RACH parameters for the selected SSB according to the RACH configuration received from the base station 502. The RACH parameters may include time/frequency resources for the RACH (e.g., RACH occasions), a RACH preamble index, etc. The RACH Msg 1 may include an SSB index to indicate the selected SSB beam. In some aspects, the RACH Msg 1 may be transmitted with a beam width that corresponds to that of the selected SSB.

At 516, the base station 502 receives the RACH Msg 1 from the UE 504 and processes the RACH Msg 1. The base station 502 determines the selected SSB from the RACH Msg 1 using the SSB index provided within the RACH Msg 1.

At 518, the UE 504 can monitor the channel for a response from the base station 502. For example, the UE 504 may monitor for a RACH Msg 2. In an aspect, the RACH component 198 may monitor the PDCCH during a RAR window based on the RACH Msg 1 to detect a PDCCH portion of the RAR message as a DCI format 1_0 with a cyclic redundancy check (CRC) scrambled by a RA-RNTI corresponding to the RACH Msg 1 and receive the PDSCH portion of the RAR message as a transport block in a corresponding PDSCH within the RAR window.

Once the base station determines, at 516, the SSB selected by the UE 504, the base station 502 may proceed to transmit downlink communication to the UE 504. The base station 502 may respond to receiving the RACH Msg 1 by transmitting a second message (RACH Msg 2), which may be referred to as a RAR message. The RAR message may include a PDCCH portion and a PDSCH portion. For example, at 520, the base station 502 may respond to the RACH Msg 1 by transmitting a random access response via RACH Msg 2. The RACH Msg 2 can include a physical downlink control channel and/or physical downlink shared channel.

In some aspects, the RACH Msg 2 includes a trigger that prompts the UE 504 to transmit multiple SRSs to the base station 502. The trigger can be defined under certain conditions determined at the base station 502. For example, depending on the power received in the RACH Msg 1 at the base station 502, the base station 502 can decide what improvements are required to complete the RACH procedure properly. In an example, if the base station 502 measures a high received power (e.g., measured received power exceeds a threshold) in the RACH Msg 1, then the base station 502 may not need to trigger SRS, or if the base station 502 measures a low received power (e.g., measured received power does not exceed a threshold), then the base station 502 may trigger the UE 504 to transmit 4 or 8 SRS symbols to obtain a better refinement of receive beams at both the base station 502 and UE 504. In some aspects, the RACH Msg 2 can include 1-bit or 2-bits to describe the number of SRS symbols to be used by the UE 504. In an aspect, a UE that is experiencing conditions that may result in poor reception of the RACH Msg 3 by the base station 502 may trigger the UE 504 to transmit multiple SRSs by way of the RACH Msg 2 to enhance reception of the Msg 3 and further RACH messages by the base station 502. For example, if the UE is an NR-Light UE that has relatively low transmission power, transmission of multiple SRSs on different OFDM symbols using different beams with different spatial filters by the UE 504 to allow the base station 502 to select the best SRS beam may improve reception of the Msg 3 at the base station 502. Other conditions that may result in poor reception of the Msg 3 may include the use of high frequencies (such as carriers in the mmWave band), an obstructed line of sight, or interference.

In an aspect, to improve coverage of the RACH Msg 3, the base station 502 may trigger transmission of multiple SRSs by the UE 504 in the RAR message. The RAR message may indicate at least one SRS trigger parameter. The SRS parameter may include at least one of: presence of trigger condition, type of spatial filter for each SRS beam, number of SRS symbols, number of OFDM symbols per SRS beam, frequency offset for frequency hopping, SRS beam index, or TCI state. In an implementation, for example, the PDCCH portion of the RAR message may include a bit field that indicates the at least one SRS trigger parameter. The PDCCH portion 422 may generally use a DCI format 1_0, which is a downlink grant format. Accordingly, the bit field of the PDCCH portion may have a different interpretation when used for a RAR message. For example, the bit field may be a single bit that indicates a trigger to transmit multiple SRSs in response to the RACH Msg 2. The bit field may be a configurable bit of the DCI format 1_0, or may be another field that has a different interpretation for the RAR message. Additional SRS trigger parameters may be either signaled via system information or standardized. For example, the RMSI of the system information may include a field that indicates one or more additional SRS trigger parameters to use when the PDCCH portion indicates SRS transmission trigger. As another example, a standards document or regulation may specify one or more additional SRS trigger parameters to use when the PDCCH portion indicates SRS transmission trigger. In some implementations, the additional SRS trigger parameters may be grouped into sets of preconfigured parameters. The UE 504 may select a set of preconfigured parameters based on the RAR message (e.g., a bit field that indicates an index of the set of preconfigured parameters).

At 522, the UE 504 can process the random access response. In some aspects, the RACH component 198 may pass the transport block to higher layers, which may parse the transport block for a random access preamble identity (RAPID) associated with the RACH Msg 1. If the higher layers identify the RAPID in the transport block, the higher layers may indicate an uplink grant to the RACH component 198 at the physical layer. This is referred to as RAR UL grant in the physical layer. For example, RACH Msg 2 may include one or more of a detected preamble identifier (ID), a timing advance (TA) value, a temporary cell radio network temporary identifier (TC-RNTI), a backoff indicator, or an UL grant. In some aspects, the UE 504 may determine that the base station 502 has prompted the UE 504 to transmit the SRSs in response to the random access response so that the base station 502 can perform beam refinement at the base station 502 and thereafter provide downlink control signaling to cause beam refinement at the UE 504 using quasi co-location information for subsequent downlink signaling.

At 524, the base station 502 may monitor for the Msg 2 triggered SRS transmissions following the transmission of the RACH Msg 2 at 520.

At 526, the UE 504 transmits multiple SRSs on different symbols within a slot with each beam having a different spatial filter. In this regard, each beam represents a sub-beam of the original beam used to transmit the RACH Msg 1 at 514 such that the aggregate of the sub-beams can cover the original beam width of the RACH Msg 1 beam. The UE 504 may transmit up to n transmissions of SRS based on the SRS trigger parameter in the RACH Msg 2. In an aspect, each SRS transmission may utilize a different beam. The beams may be sub-beams of a previously determined beam (e.g., based on the receive beam at UE 504 for receiving SSB at 512). Accordingly, the sub-beams may refine the previously determined beam and one or more of the sub-beams may be received with greater power or quality. In an aspect, each SRS transmission may utilize a different spatial filter. The at least one SRS trigger parameter may include a change in the spatial filter between SRS transmissions. For example, the UE 504 may add or subtract the change in the transmission direction for each of the n SRS transmissions to beam sweep within the beam width of the original RACH Msg 1.

At 528, the base station 502 receives the multiple SRS transmissions and measures each of the SRS transmissions to determine the best SRS beam. In this regard, the base station 502 may utilize the selected SRS beam to determine its own refined receive beam prior to transmission of a RACH Msg 3 from the UE 504. The refined receive beam at the base station 502 may be quasi co-located with the selected SRS beam. The base station 502 may determine the SRS index of the selected SRS beam. The base station 502 can generate an SRI to indicate the SRS index that corresponds to the selected SRS beam. In some aspects, the SRI may include information that indicate the SRS resources used to transmit the selected SRS beam.

At 530, the base station 502 transmits a downlink control signal that includes the SRI. Based on this, the UE 504 can transmit the RACH Msg 3 with a more narrow beam. In some implementations, the downlink control signal may correspond to a PDCCH portion contained within a downlink transmission. Typically, in the same slot as receiving the PDCCH, the UE 504 may also transmit the PUSCH of RACH Msg 3. However, the system may need some latency to configure the uplink. In some aspects, the PDCCH can configure timing information of the RACH Msg 3 using a k1 parameter (e.g., the latency can be controlled by the k1 parameter), where the RACH Msg 3 is not scheduled in the same slot as the PDCCH but rather in the next (or few) subsequent slots following the slot containing the PDCCH. In this regard, the k1 parameter may be set to be larger than zero (meaning the PUSCH portion of RACH Msg 3 is not transmitted in the same slot as the PDCCH).

At 532, the UE 504 may receive the SRI and process the SRI to generate QCL information. In this regard, the UE 504 may utilize the QCL information to determine its own refined receive beam prior to transmission of a RACH Msg 4 from the base station 502. The refined receive beam at the UE 504 may be quasi co-located with the SRS beam indicated by the SRI. In an aspect, to improve coverage of the RACH Msg 4 at the UE 504, the UE 504 may utilize the SRI received in the PDCCH portion of the RACH Msg 2 as QCL. In some aspects, the UE 504 may determine QCL information that indicates that the SR beam is quasi co-located with the PDSCH portion of the RACH Msg 4. In one or more implementations, the SRI may indicate an index of the selected SRS beam. The SRI signaling also may indicate a resource of the selected SRS beam. In some implementations, the SRI signaling may include various types of association information, such as if both control and data are scheduled using the same beam or phase continuity between control and data signals. The SRI may also include a measure of correlation between the beam shapes applied in control and the data region. In some aspects, the SRI signaling may include an indication of quasi co-location between the beams used in control and data regions. The SRI signaling may allow a receiving device, such as the UE 504, to know whether it can assume QCL (or an assumed degree of quasi-colocation) of control and data to estimate parameters, such as Doppler Spread, delay spread, frequency, and timing, and utilize these for data channel estimation. Alternatively, or additionally, the SRI signaling may also allow the UE 504 to determine whether it can assume if certain control and data components are spatially quasi co-located with respect to QCL Type D, meaning QCL with respect to receiver spatial properties, such as beam shape or angle of departure (AoD) from a transmitter. Spatial QCL information may, for example, allow a receiver to use same receive beamforming for two downlink signals (data and control) that are indicated as spatially quasi co-located.

In any case, the UE 504 may utilize this information regarding beam association to enhance channel estimation, both for the data, as well as the control region. In some cases, the UE 504 may receive signaling that the data channel (e.g., PDSCH) and the control channel (e.g., PDCCH) can be transmitted using the same beam. In this case, the UE 504 may utilize the SRI to estimate parameters for both data and control regions. For example, if the SRI signaling is used as the QCL, the UE 504 may determine that the control and data channels are quasi co-located. In this regard, the UE 504 may use the SRS in the control region to estimate parameters such as delay spread, Doppler, frequency error, timing error, and the like. The UE can utilize this information to enhance channel estimation for the data region.

At 534, the base station 502 may monitor for transmission of the RACH Msg 3 using a refined receive beam at the base station 502 as determined at 528.

At 536, the UE 504 transmits the RACH Msg 3 to the base station 502. In response to receiving the RACH Msg 2 PDSCH portion, the UE 504 transmits to the base station 502 a third message (RACH Msg 3), which may be an RRC connection request or a scheduling request, via a physical uplink channel such as PUSCH based on the RAR UL grant provided in the RACH Msg 2 of the base station 502. In some aspects, the RACH Msg 3 may be transmitted on a refined beam to the base station 502.

At 538, the UE 504 may monitor for transmission of the RACH Msg 4 using a refined receive beam at the UE 504 as determined at 532. Alternatively to 530, the PDCCH portion of RACH Msg 4 may include the SRI indicating which SRS beam was the best measured beam at the base station 502.

At 540, the base station 502 transmits the RACH Msg 4 to the UE 504. In response to receiving the RACH Msg 3 and/or the multiple SRS transmissions by the UE 504, the base station 502 may transmit a fourth message (RACH Msg 4), which may be referred to as a contention resolution message, to UE 504 via a PDCCH and a PDSCH. For example, RACH Msg 4 may include a cell radio network temporary identifier (C-RNTI) for UE 504 to use in subsequent communications. In an aspect, the base station 502 may select a beam for transmission of the RACH Msg 4 based on which SRS beam of the multiple SRS beams is the strongest.

Alternatively, the UE 504 can receive a separate control signal (unrelated to RACH Msg 4) indicating which SRS beam was the best, where the UE 504 can use that selected beam (associated with SRI) to send the RACH Msg 3.

At 541, the UE receives the RACH Msg 4 PDSCH with the refined receive beam.

At 542, the UE transmits a connection request to the base station 502. In some aspects, the connection request may include a PUCCH signal that includes uplink control information of the UE 504.

At 544, upon receiving the connection request, the base station 502 processes the connection request from the UE 504.

At 546, the base station 502 acknowledges the connection request by transmitting a connection response to the UE 504.

Figure 6:
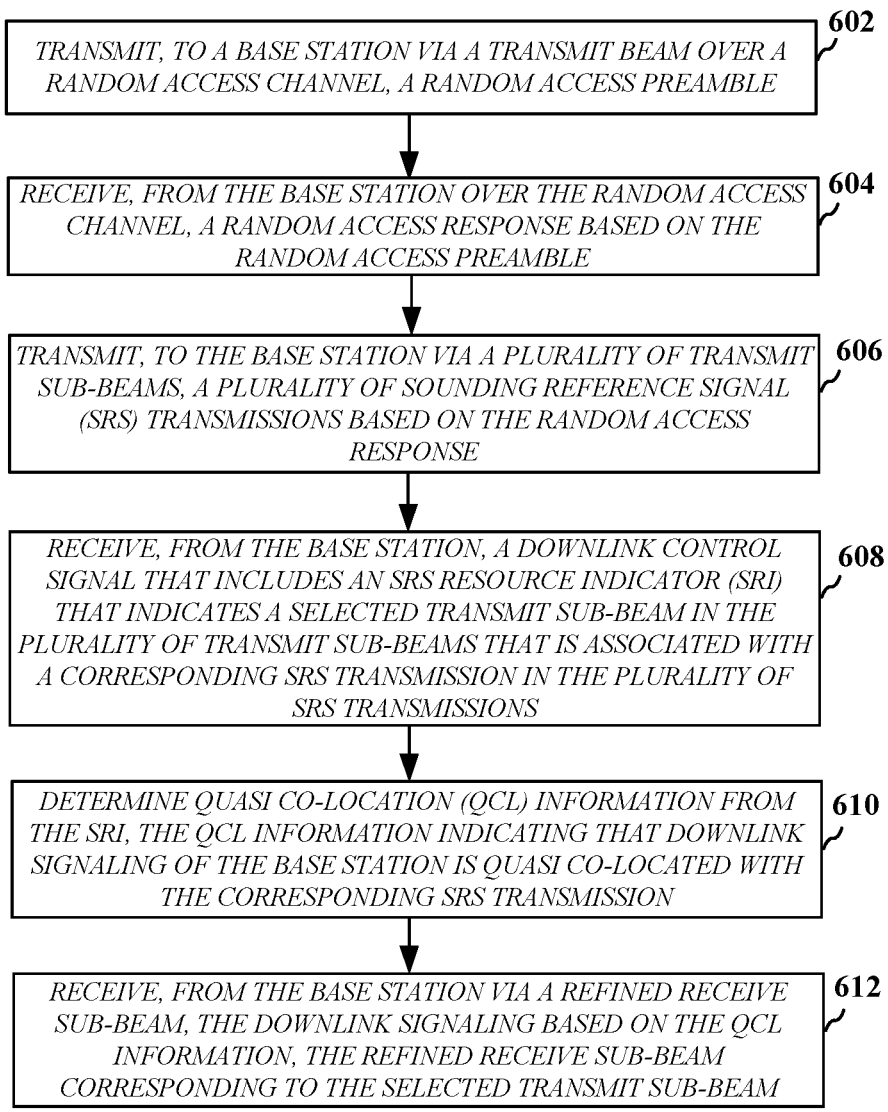
FIG. 6 is a flowchart of a process of wireless communication for SRS beams triggered by RACH message 2 for RACH Message 4 PDSCH QCL at a user equipment, in accordance with some aspects of the present disclosure.

FIG. 6 is a flowchart of a process 600 of wireless communication for SRS beams triggered by RACH message 2 for RACH Message 4 PDSCH QCL at a user equipment, in accordance with some aspects of the present disclosure. The process 600 may be performed by a UE (e.g., the UE 104; UE 350, UE 404, UE 504, the RSU 107). As illustrated, the process 600 includes a number of enumerated steps, but implementations of the process 600 may include additional steps before, after, and in between the enumerated steps. In some implementations, one or more of the enumerated steps may be omitted or performed in a different order.

At 602, the UE may communicate, with a base station via a transmit beam over a random access channel, a random access preamble. The UE can communicate the random access preamble, e.g., as described in connection with FIGS. 1-5. In some aspects, the UE can transmit, to the base station, a random access message 1 via the transmit beam having a first beam width that corresponds to a second beam width of the one of the plurality of receive beams.

At 604, the UE may receive, from the base station over the random access channel, a random access response (e.g., RACH message 2) based on the random access preamble. The UE can receive the random access response, e.g., as described in connection with FIGS. 1-5. In some aspects, the RACH message 2 includes an indication to the UE to transmit the plurality of SRS transmissions in a slot different than transmission of the RACH message 3. In some aspects, the indication includes a parameter indicating separation between the plurality of SRS transmissions and the RACH message 3 by a predetermined number of slots. In some aspects, the UE can detect a trigger signal in the RACH message 2. In other aspects, the UE can receive a trigger signal in a PDCCH portion of the RACH message 2. In some aspects, the PDCCH of the RACH message 2 can indicate to the UE a number of SRS symbols to utilize for the plurality of SRS transmissions. In some aspects, each of the plurality of SRS transmissions is transmitted on a respective SRS symbol. In some aspects, the RACH message 2 includes an indication of a factor to the UE to produce each of the plurality of transmit sub-beams as a predetermined scaling factor (e.g., a percentage, a fraction, or the like) of a beam width of the transmit beam. In some aspects, the UE can receive, from the base station, an indication of a trigger condition associated with the random access preamble, and the communicating the plurality of SRS transmissions comprises transmitting the plurality of SRS transmissions when the trigger condition indicates that reception of the random access preamble at the base station is not satisfied.

At 606, the UE may communicate, with the base station via a plurality of transmit sub-beams, a plurality of SRS transmissions based on the random access response. The UE can communicate the plurality of SRS transmissions, e.g., as described in connection with FIGS. 1-5. In some aspects, each of the plurality of SRS transmissions includes a same SRS transmission with a different spatial filter. In some aspects, the UE can transmit, to the base station, each of the plurality of SRS transmissions with a different spatial filter within a beam width of the transmit beam. In other aspects, the UE can transmit, to the base station via respective ones of the plurality of transmit sub-beams, each of the plurality of SRS transmissions on a different symbol within a same slot. In some aspects, the UE can transmit the plurality of SRS transmissions on different OFDM symbols with different spatial filters. In some aspects, the plurality of transmit sub-beams have respective beam widths that cover at least in part a beam width of the transmit beam. In some aspects, each of the respective beams widths of the plurality of transmit sub-beams is smaller than the beam width of the transmit beam. In some aspects, the UE can transmit, to the base station, the plurality of SRS transmissions prior to transmission of the RACH message 3. In other aspects, the UE can transmit, to the base station, the plurality of SRS transmissions in a same slot as the RACH message 3, the RACH message 2 comprises an indication to transmit the plurality of SRS transmissions in the same slot as the RACH message 3. In some aspects, the UE can transmit, to the base station, the plurality of SRS transmissions in response to the detecting of the trigger signal (e.g., at 604).

At 608, the UE may receive, from the base station, a downlink control signal that includes an SRI that indicates a selected transmit sub-beam in the plurality of transmit sub-beams that is associated with a corresponding SRS transmission in the plurality of SRS transmissions. The UE can receive the SRI, e.g., as described in connection with FIGS. 1-5. In some aspects, the UE can receive, from the base station, a RACH message 4 at a slot that is subsequent to transmission of the RACH message 3. In some aspects, the downlink control signal is included in the PDCCH portion of the RACH message 4 and the downlink signaling is included in a PDSCH portion of the RACH message 4. In some aspects, the RACH message 4 is quasi co-located with one of the plurality of SRS transmissions with respect to spatial reception parameters. In some aspects, the UE can receive a PDSCH or a PDCCH with the refined receive beam on a resource that corresponds to the SRI.

At 610, the UE may determine QCL information from the SRI. In some aspects, the QCL information indicates that downlink signaling of the base station is quasi co-located with the corresponding SRS transmission. The UE can determine the QCL information, e.g., as described in connection with FIGS. 1, 4 and 5. In some aspects, the QCL information indicates one of a plurality of QCL types. For example, the one of the plurality of QCL types corresponds to QCL Type D, although other QCL types, such as Type A, Type B or Type C, may be applicable in other implementations.

At 612, the UE may receive, from the base station via a refined receive sub-beam, the downlink signaling based on the QCL information. In some aspects, the refined receive sub-beam corresponds to the selected transmit sub-beam. The UE can receive the downlink signaling, e.g., as described in connection with FIGS. 1-5.

In some aspects, prior to the RACH procedure, the UE can receive, from the base station over a physical broadcast channel, a plurality of SSBs via respective ones of a plurality of receive beams. The UE can obtain one or more measurements of each of the plurality of SSBs by a beam sweep operation with the plurality of receive beams. The UE also can determine a beam pair indicating a pairing between one of the plurality of SSBs and one of the plurality of receive beams based on the one or more measurements. The UE can select a first receive beam of the plurality of receive beams based on the one or more measurements. In some aspects, the first receive beam corresponds to a downlink transmit beam carrying a first SSB of the plurality of SSBs.

Figure 7:
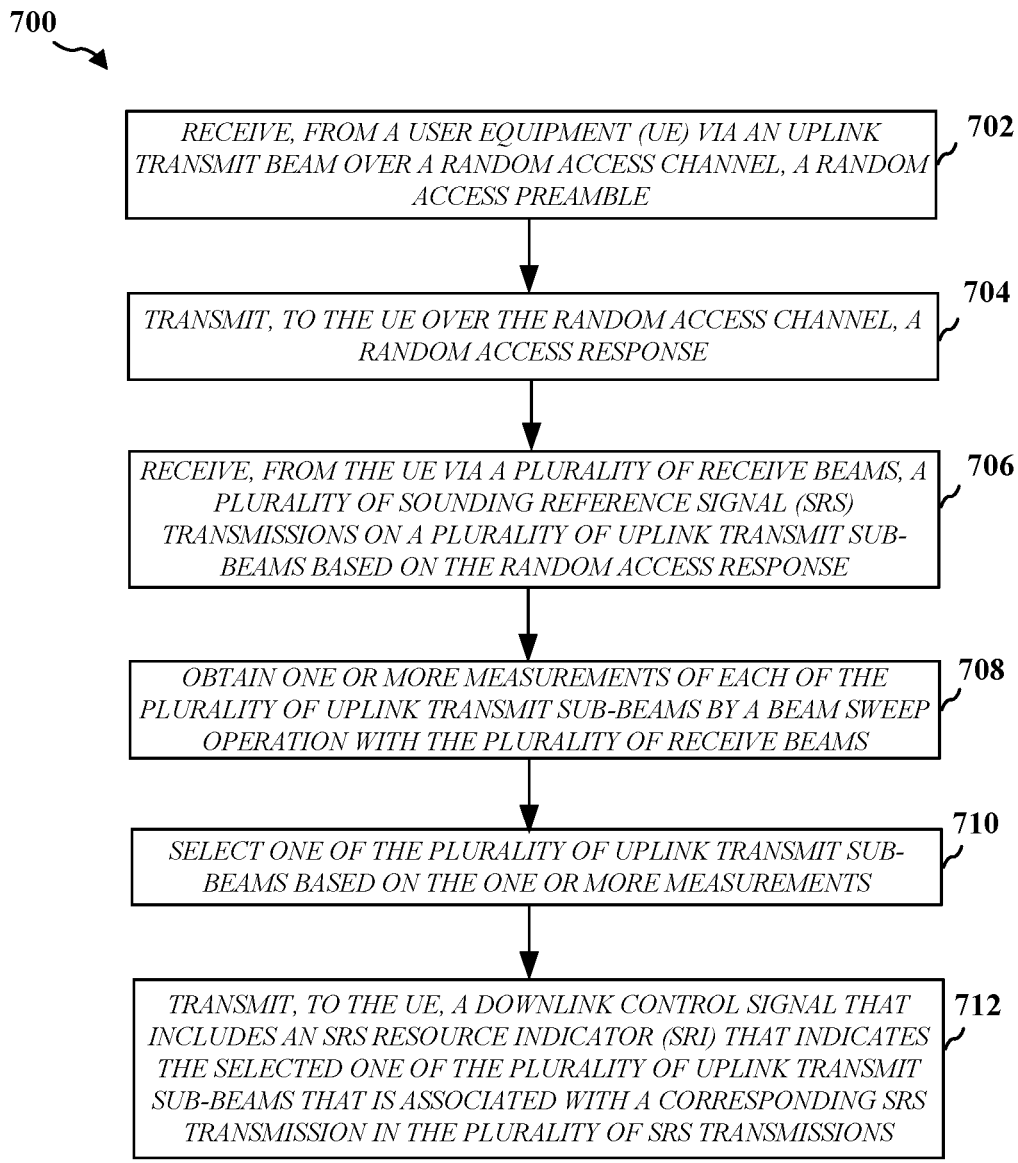
FIG. 7 is a flowchart of a process of wireless communication for SRS beams triggered by RACH message 2 for RACH Message 4 PDSCH QCL at a base station, in accordance with some aspects of the present disclosure.

FIG. 7 is a flowchart of a process 700 of wireless communication for SRS beams triggered by RACH message 2 for RACH Message 4 PDSCH QCL at a base station, in accordance with some aspects of the present disclosure. The process 700 may be performed by a BS (e.g., the BS 102, 180; base station 310; BS 402, 502). As illustrated, the process 700 includes a number of enumerated steps, but implementations of the process 700 may include additional steps before, after, and in between the enumerated steps. In some implementations, one or more of the enumerated steps may be omitted or performed in a different order.

At 702, the BS may receive, from a user equipment (UE) via an uplink transmit beam over a random access channel, a random access preamble. The BS can receive the random access preamble, e.g., as described in connection with FIGS. 1-5.

At 704, the BS may communicate, with the UE over the random access channel, a random access response. The BS can communicate the random access response, e.g., as described in connection with FIGS. 1-5.

At 706, the BS may receive, from the UE via a plurality of receive beams, a plurality of SRS transmissions on a plurality of uplink transmit sub-beams based on the random access response. The BS can receive the plurality of SRS transmissions, e.g., as described in connection with FIGS. 1-5. In some aspects, the BS can receive, from the UE, each of the plurality of SRS transmissions with a different spatial filter within a beam width of the uplink transmit beam. In other aspects, the BS can receive, from the UE on respective ones of the plurality of uplink transmit sub-beams, each of the plurality of SRS transmissions with a different spatial filter on a different symbol within a same slot.

At 708, the BS may obtain one or more measurements of each of the plurality of uplink transmit sub-beams by a beam sweep operation with the plurality of receive beams. The BS can obtain the measurements, e.g., as described in connection with FIGS. 1, 4 and 5.

At 710, the BS may select one of the plurality of uplink transmit sub-beams based on the one or more measurements. The BS can select the uplink transmit sub-beam, e.g., as described in connection with FIGS. 1, 4 and 5. In some aspects, the BS can select one of the plurality of receive beams as a refined receive beam based on the one or more measurements of the plurality of uplink transmit sub-beams. In some aspects, the refined receive beam corresponds to the selected one of the plurality of uplink transmit sub-beams that is indicated by the SRI.

At 712, the BS may communicate, with the UE, a downlink control signal that includes an SRI that indicates the selected one of the plurality of uplink transmit sub-beams that is associated with a corresponding SRS transmission in the plurality of SRS transmissions. The BS can communicate the SRI, e.g., as described in connection with FIGS. 1-5. In turn, the BS can receive, from the UE via the refined receive beam, an uplink data signal.

Figure 8:
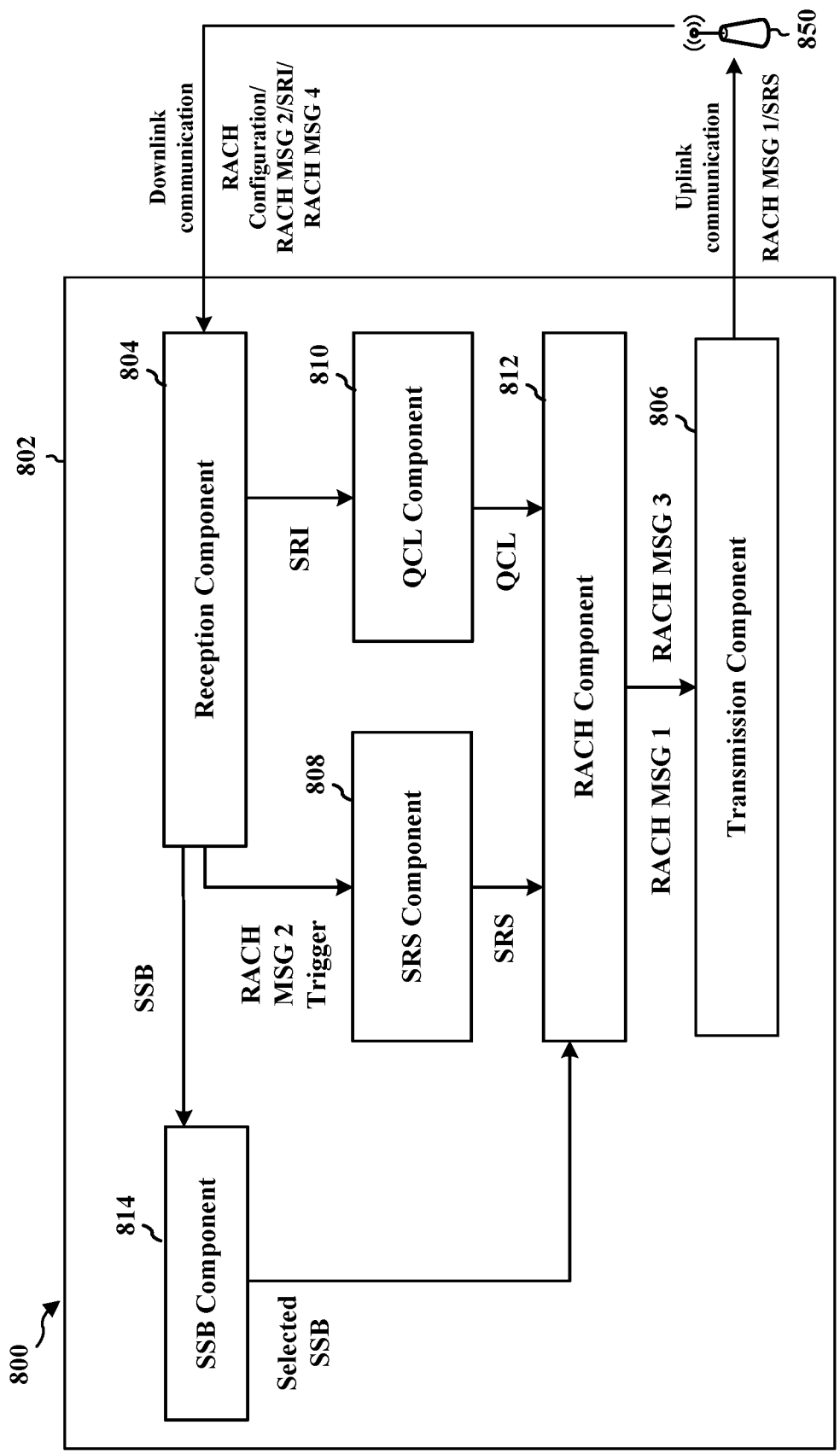
FIG. 8 is a conceptual data flow diagram illustrating the data flow between different means/components at a user equipment in an exemplary apparatus.

FIG. 8 is a conceptual data flow diagram 800 illustrating the data flow between different means/components in an exemplary apparatus 802. The apparatus may be a UE (e.g., UE 104, 350, 404, 504) in wireless communication with base station 850.

The apparatus includes a reception component 804 that receives downlink communication from the base station 850. The reception component 804 may be configured to receive signals and/or other information from other devices including, e.g., base station 850. The signals/information received by the reception component 804 may be provided to one or more components of the apparatus 802 for further processing and use in performing various operations in accordance with the methods discussed supra including the process 600 of the aforementioned flowchart of FIG. 6. Thus, via the reception component 804, the apparatus 802 and/or one or more components therein receive signals and/or other information (e.g., such as downlink data for the apparatus 802 and/or other control signaling) from the base station 850 as discussed supra and also discussed more specifically infra.

In some aspects, the reception component 804 is configured to receive, from the base station over the random access channel, a random access response based on the random access preamble, e.g., as described in connection with block 602 of FIG. 6. In some aspects, the reception component 804 is configured to receiving, from the base station, a downlink control signal that includes an SRS resource indicator (SRI) that indicates a selected transmit sub-beam in the plurality of transmit sub-beams that is associated with a corresponding SRS transmission in the plurality of SRS transmissions, e.g., as described in connection with block 608 of FIG. 6. In some aspects, the reception component 804 can receive, from the base station via a refined receive sub-beam, the downlink signaling based on the QCL information, the refined receive sub-beam corresponding to the selected transmit sub-beam, e.g., as described in connection with block 612 of FIG. 6. In some aspects, the reception component 804 can receive, from the base station over a physical broadcast channel, a plurality of SSBs via respective ones of a plurality of receive beams. In some aspects, the reception component 804 can receive a trigger signal in a PDCCH of the RACH message 2. The trigger signal may include an indication to the UE to transmit the plurality of SRS transmissions. In some aspects, the reception component 804 can receive, from the base station, a RACH message 4 at a slot that is subsequent to transmission of the RACH message 3. In some aspects, the reception component 804 can receive a PDSCH or a PDCCH with the refined receive beam on a resource that corresponds to the SRI. In some aspects, the reception component 804 can receive, from the base station, an indication of a trigger condition associated with the random access preamble.

The apparatus includes a SRS component 808 configured to receive, via the reception component 804, the random access response based on the random access preamble. The SRS component 808 can transmit, in coordination with the transmission component 806 via a plurality of transmit sub-beams, a plurality of SRS transmissions based on the random access response. In some aspects, the SRS component 808 can transmit, via the transmission component 806, each of the plurality of SRS transmissions with a different spatial filter within a beam width of the transmit beam. In some aspects, the SRS component 808 is configured to transmit, in coordination with the transmission component 806, to the base station via respective ones of the plurality of transmit sub-beams, each of the plurality of SRS transmissions on a different symbol within a same slot. In some aspects, the SRS component 808 can prepare the plurality of SRS transmissions for transmission on different OFDM symbols with different spatial filters. In some aspects, the SRS component 808 is configured to transmit, in coordination with the transmission component 806, the plurality of SRS transmissions prior to transmission of the RACH message 3. In other aspects, the SRS component 808 is configured to transmit, in coordination with the transmission component 806, the plurality of SRS transmissions in a same slot as the RACH message 3. In some aspects, in receiving the RACH message 2, the SRS component 808 can detect a trigger signal in the RACH message 2. In this regard, the SRS component 808 can transmit, in coordination with the transmission component 806, the plurality of SRS transmissions in response to the detecting of the trigger signal.

The apparatus includes a QCL component 810 configured to determine QCL information from the SRI, e.g., as described in connection with block 610 of FIG. 6. In some aspects, the QCL information indicates that downlink signaling of the base station is quasi co-located with the corresponding SRS transmission. In some aspects, the QCL information indicates one of a plurality of QCL types. For example, the one of the plurality of QCL types corresponds to QCL Type D, among other types.

The apparatus includes a RACH component 812 configured to transmit, in coordination with the transmission component 806, to the base station, a random access message 1 via the transmit beam having a first beam width that corresponds to a second beam width of the one of the plurality of receive beams. In some aspects, the RACH component 812 can select a first receive beam of the plurality of receive beams based on the one or more measurements. In this regard, the first receive beam corresponds to a downlink transmit beam carrying a first SSB of the plurality of SSBs. In some aspects, the RACH component 812 can transmit, in coordination with the transmission component 806, a random access message 1 via the transmit beam having a first beam width that corresponds to a second beam width of the one of the plurality of receive beams. In some aspects, the RACH component 812 can transmit, in coordination with the transmission component 806, in response to the random access message 2, a random access message 3 with a beam width that corresponds to the selected transmit sub-beam. In some aspects, the RACH component 812 can select the refined receive sub-beam from a plurality of receive sub-beams based on the selected transmit sub-beam.

The apparatus includes a SSB component 814 configured to receive, in coordination with the reception component 804, from the base station over a physical broadcast channel, a plurality of SSBs via respective ones of a plurality of receive beams. The SSB component 814 can obtain one or more measurements of each of the plurality of SSBs by a beam sweep operation with the plurality of receive beams. The SSB component 814 can determine a beam pair indicating a pairing between one of the plurality of SSBs and one of the plurality of receive beams based on the one or more measurements.

The apparatus includes a transmission component 806 that transmits uplink communication to the base station 850. The transmission component 806 may be configured to transmit various messages to one or more external devices, e.g., including the base station 850, in accordance with the methods disclosed herein. The messages/signals to be transmitted may be generated by one or more other components as discussed above, or the messages/signals to be transmitted may be generated by the transmission component 806 under the direction/control of the one or more other components discussed supra. Thus, in various configurations, via the transmission component 806, the apparatus 802 and/or one or more components therein transmit signals and/or other information (e.g., such as uplink data, control messages and/or other signals) to external devices such as the base station 850. In some aspects, the transmission component 806 is configured to communicate, with a base station via a transmit beam over a random access channel, a random access preamble, e.g., as described in connection with block 602 of FIG. 6. In some aspects, the transmission component 806 is configured to communicate, with the base station via a plurality of transmit sub-beams, a plurality of sounding reference signal (SRS) transmissions based on the random access response, e.g., as described in connection with block 606 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
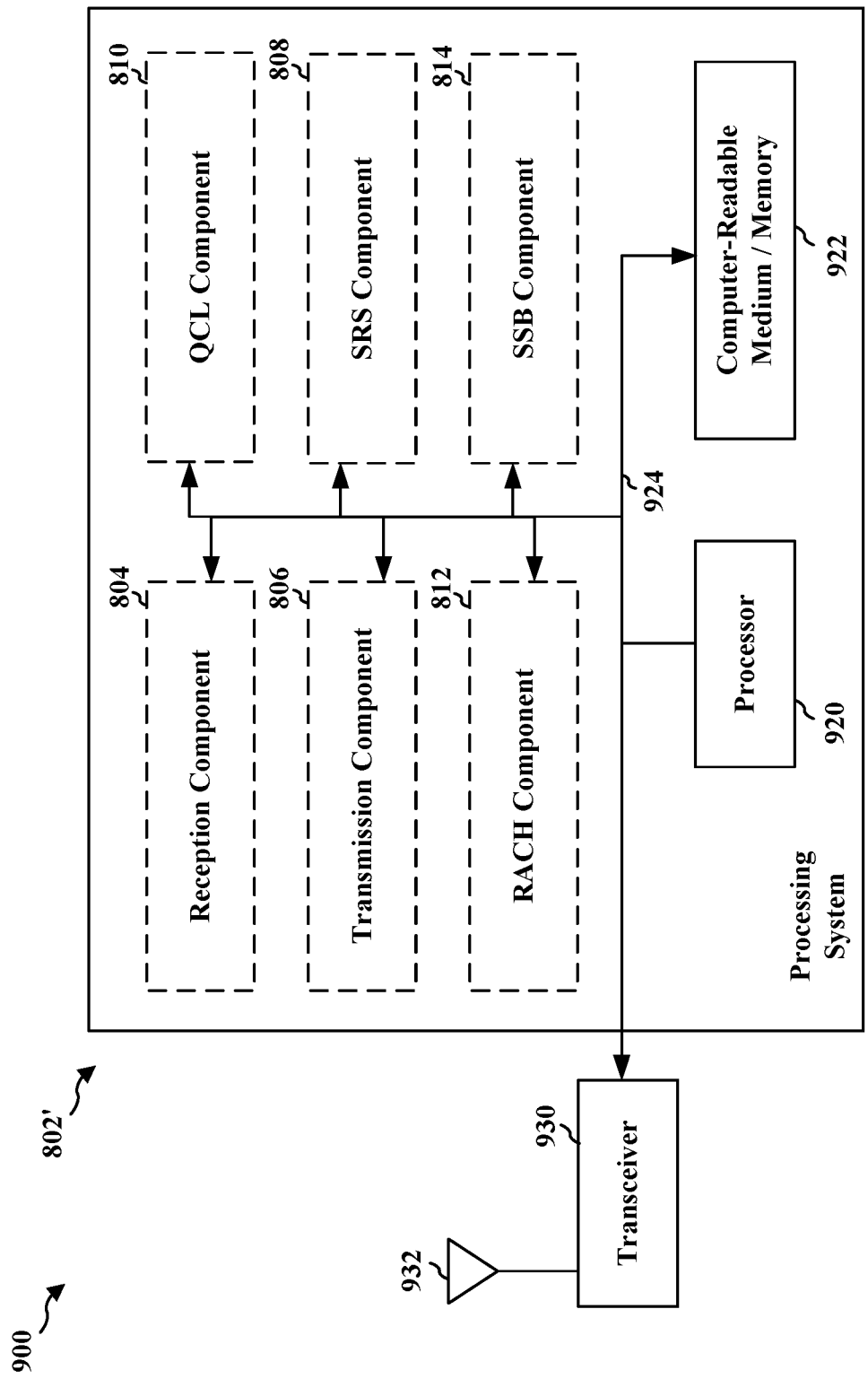
FIG. 9 is a diagram illustrating an example of a hardware implementation for an apparatus at the user equipment employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 920, the components 804, 806, 808, 810, 812, 814 and the computer-readable medium/memory 922. The bus 924 may also link various other circuits such as timing sources, peripherals, voltage regulators, and power management circuits, which are well known in the art, and therefore, will not be described any further.

The processing system 914 may be coupled to a transceiver 930. The transceiver 930 is coupled to one or more antennas 932. The transceiver 930 provides a means for communicating with various other apparatus over a transmission medium. The transceiver 930 receives a signal from the one or more antennas 932, extracts information from the received signal, and provides the extracted information to the processing system 914, specifically the reception component 804. In addition, the transceiver 930 receives information from the processing system 914, specifically the transmission component 806, and based on the received information, generates a signal to be applied to the one or more antennas 932. The processing system 914 includes a processor 920 coupled to a computer-readable medium/memory 922. The processor 920 is responsible for general processing, including the execution of software stored on the computer-readable medium/memory 922. The software, when executed by the processor 920, causes the processing system 914 to perform the various functions described supra for any particular apparatus. The computer-readable medium/memory 922 may also be used for storing data that is manipulated by the processor 920 when executing software. The processing system 914 further includes at least one of the components 804, 806, 808, 810, 812, 814. The components may be software components running in the processor 920, resident/stored in the computer readable medium/memory 922, one or more hardware components coupled to the processor 920, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for transmitting, to a base station via a transmit beam over a random access channel, a random access preamble. The apparatus 802/802' also includes means for receiving, from the base station over the random access channel, a random access response based on the random access preamble. The apparatus 802/802' also includes means for transmitting, to the base station via a plurality of transmit sub-beams, a plurality of sounding reference signal (SRS) transmissions based on the random access response. The apparatus 802/802' also includes means for receiving, from the base station, a downlink control signal that includes an SRS resource indicator (SRI) that indicates a selected transmit sub-beam in the plurality of transmit sub-beams that is associated with a corresponding SRS transmission in the plurality of SRS transmissions. The apparatus 802/802' also includes means for determining quasi co-location (QCL) information from the SRI, the QCL information indicating that downlink signaling of the base station is quasi co-located with the corresponding SRS transmission. The apparatus 802/802' also includes means for receiving, from the base station via a refined receive sub-beam, the downlink signaling based on the QCL information, the refined receive sub-beam corresponding to the selected transmit sub-beam. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
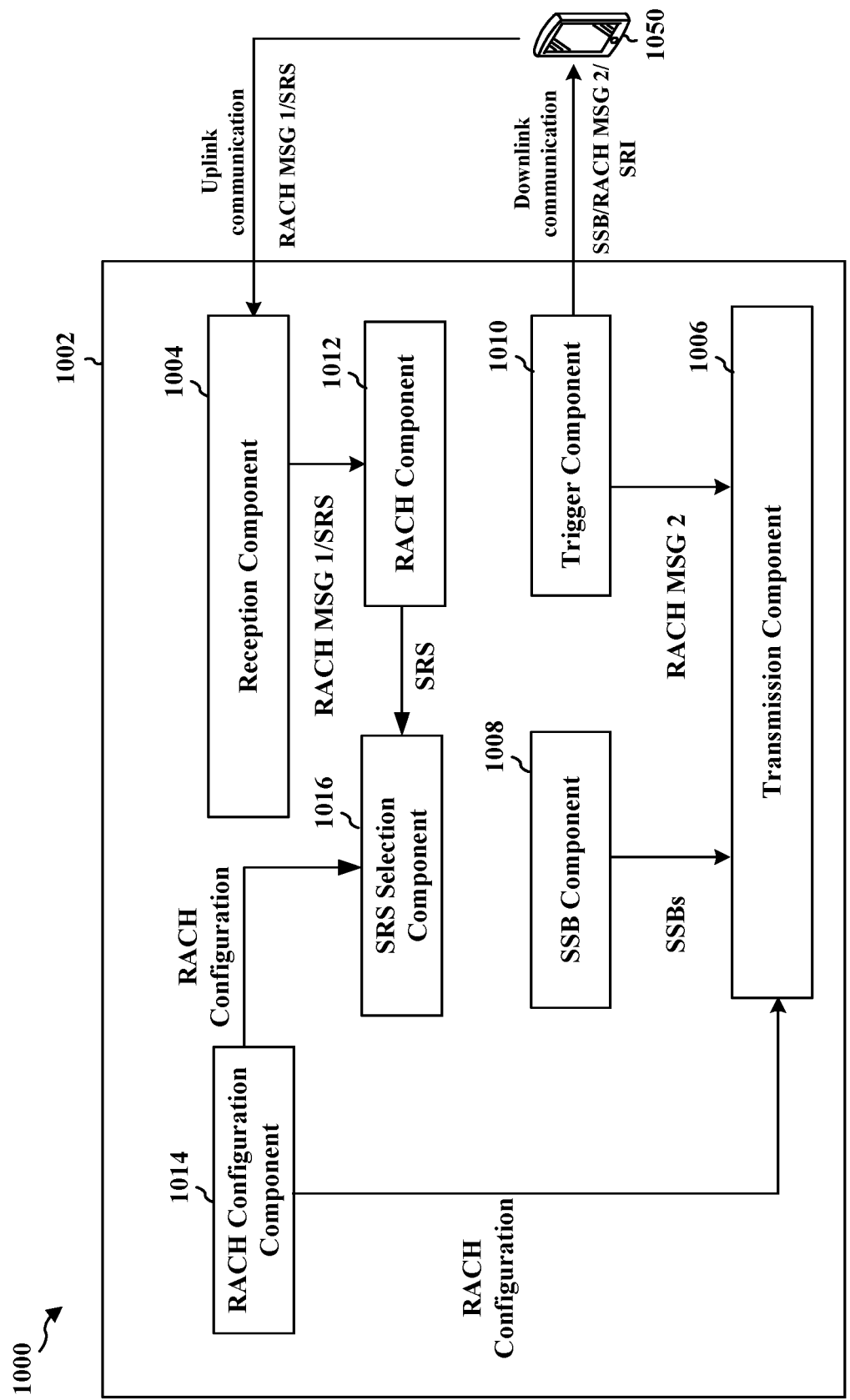
FIG. 10 is a conceptual data flow diagram illustrating the data flow between different means/components at a base station in an exemplary apparatus.

FIG. 10 is a conceptual data flow diagram 1000 illustrating the data flow between different means/components in an exemplary apparatus 1002. The apparatus may be a base station (e.g., BS 102, 180, 310, 402, 502) in wireless communication with UE 1050.

The apparatus includes a reception component 1004 that receives uplink communication from the UE 1050. The reception component 1004 may be configured to receive signals and/or other information from other devices including, e.g., UE 1050. The signals/information received by the reception component 1004 may be provided to one or more components of the apparatus 1002 for further processing and use in performing various operations in accordance with the methods discussed supra including the process 700 of the aforementioned flowchart of FIG. 7. Thus, via the reception component 1004, the apparatus 1002 and/or one or more components therein receive signals and/or other information (e.g., such as uplink data for the apparatus 1002 and/or other control signaling) from the UE 1050 as discussed supra and also discussed more specifically infra. In some aspects, the reception component 1004 is configured to receive, from a UE via an uplink transmit beam over a random access channel, a random access preamble, e.g., as described in connection with block 702 of FIG. 7. In some aspects, the reception component 1004 may be configured to receive, from the UE via a plurality of receive beams, a plurality of SRS transmissions on a plurality of uplink transmit sub-beams based on the random access response, e.g., as described in connection with block 706 of FIG. 7.

The apparatus includes a SSB component 1008 configured to transmit, over a physical broadcast channel, a plurality of SSBs via respective ones of a plurality of receive beams.

The apparatus includes a trigger component 1010 configured to generate a trigger signal in PDCCH portion of the RACH message 2. In some aspects, the trigger signal includes an indication to the UE to transmit the plurality of SRS transmissions. In some aspects, the trigger component 1010 can determine whether a measured received power of the RACH message 1 exceeds a threshold, where the trigger component 1010 issues the trigger signal when the measured received power does not exceed the threshold.

The apparatus includes a RACH component 1012 configured to receive, in coordination with the reception component 1004, the random access preamble, e.g., as described in connection with block 702 of FIG. 7. The RACH component 1012 can communicate, in coordination with the transmission component 1006, a random access response over the random access channel. In some aspects, the RACH component 1012 can select one of the plurality of receive beams as a refined receive beam based on the one or more measurements of the plurality of uplink transmit sub-beams. In some aspects, the refined receive beam corresponds to the selected one of the plurality of uplink transmit sub-beams that is indicated by the SRI. In this regard, the RACH component 1012 can receive, in coordination with the reception component 1004, from the UE via the refined receive beam, an uplink data signal using the refined receive beam.

The apparatus includes a RACH configuration component 1014 configured to generate a RACH configuration that configures the UE for a RACH procedure based on configurable RACH parameters. The RACH configuration may indicate a predetermined threshold for comparing measured SSBs at the UE. The RACH configuration also may indicate a scaling factor for beam shaping of uplink transmit beams during the RACH procedure (e.g., radiating narrower beams). The RACH parameters may include time/frequency resources for the RACH (e.g., RACH occasions), a RACH preamble index, etc. The RACH Msg 1 may include an SSB index to indicate the selected SSB beam. In some aspects, the RACH Msg 1 may be transmitted with a beam width that corresponds to that of the selected SSB.

The apparatus includes a SRS selection component 1016 configured to receive, from the UE via a plurality of receive beams, a plurality of sounding reference signal (SRS) transmissions on a plurality of uplink transmit sub-beams based on the random access response, e.g., as described in connection with block 706 of FIG. 7. In some aspects, the SRS selection component 1016 can obtain one or more measurements of each of the plurality of uplink transmit sub-beams by a beam sweep operation with the plurality of receive beams, e.g., as described in connection with block 708 of FIG. 7. In some aspects, the SRS selection component 1016 can select one of the plurality of uplink transmit sub-beams based on the one or more measurements, e.g., as described in connection with block 710 of FIG. 7. In some aspects, the SRS selection component 1016 can receive, from the UE, each of the plurality of SRS transmissions having a different spatial filter within a beam width of the uplink transmit beam. In other aspects, the SRS selection component 1016 can receive, from the UE on respective ones of the plurality of uplink transmit sub-beams, each of the plurality of SRS transmissions having a different spatial filter on a different symbol within a same slot.

The apparatus includes a transmission component 1006 that transmits uplink communication to the UE 1050. The transmission component 1006 may be configured to transmit various messages to one or more external devices, e.g., including the UE 1050, in accordance with the methods disclosed herein. The messages/signals to be transmitted may be generated by one or more other components as discussed above, or the messages/signals to be transmitted may be generated by the transmission component 1006 under the direction/control of the one or more other components discussed supra. Thus, in various configurations, via the transmission component 1006, the apparatus 1002 and/or one or more components therein transmit signals and/or other information (e.g., such as downlink data, control messages and/or other signals) to external devices such as the UE 1050. In some aspects, the transmission component 1006 is configured to communicate, with the UE over the random access channel, a random access response, e.g., as described in connection with block 704 of FIG. 7. In some aspects, the transmission component 1006 is configured to communicate, in coordination with the SRS selection component 1016, a downlink control signal that includes an SRI that indicates the selected one of the plurality of uplink transmit sub-beams that is associated with a corresponding SRS transmission in the plurality of SRS transmissions, e.g., as described in connection with block 712 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
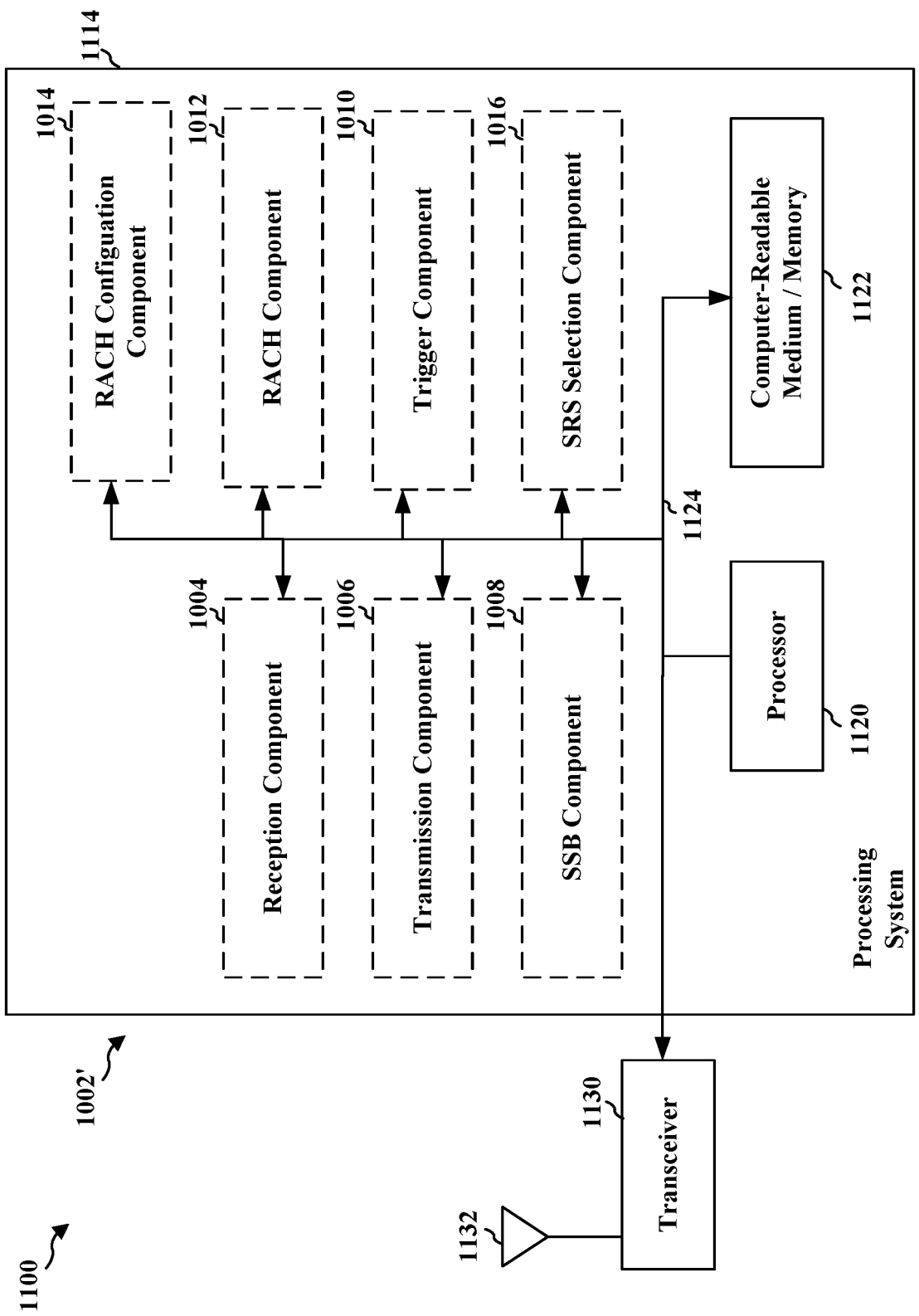
FIG. 11 is a diagram illustrating an example of a hardware implementation for an apparatus at the base station employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1120, the components 1004, 1006, 1008, 1010, 1012, 1014, 1016 and the computer-readable medium/memory 1122. The bus 1124 may also link various other circuits such as timing sources, peripherals, voltage regulators, and power management circuits, which are well known in the art, and therefore, will not be described any further.

The processing system 1114 may be coupled to a transceiver 1130. The transceiver 1130 is coupled to one or more antennas 1132. The transceiver 1130 provides a means for communicating with various other apparatus over a transmission medium. The transceiver 1130 receives a signal from the one or more antennas 1132, extracts information from the received signal, and provides the extracted information to the processing system 1114, specifically the reception component 1004. In addition, the transceiver 1130 receives information from the processing system 1114, specifically the transmission component 1006, and based on the received information, generates a signal to be applied to the one or more antennas 1132. The processing system 1114 includes a processor 1120 coupled to a computer-readable medium/memory 1122. The processor 1120 is responsible for general processing, including the execution of software stored on the computer-readable medium/memory 1122. The software, when executed by the processor 1120, causes the processing system 1114 to perform the various functions described supra for any particular apparatus. The computer-readable medium/memory 1122 may also be used for storing data that is manipulated by the processor 1120 when executing software. The processing system 1114 further includes at least one of the components 1004, 1006, 1008, 1010, 1012, 1014, 1016. The components may be software components running in the processor 1120, resident/stored in the computer readable medium/memory 1122, one or more hardware components coupled to the processor 1120, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving, from a user equipment (UE) via an uplink transmit beam over a random access channel, a random access preamble. The apparatus 1002/1002' also includes means for transmitting, to the UE over the random access channel, a random access response; receiving, from the UE via a plurality of receive beams, a plurality of sounding reference signal (SRS) transmissions on a plurality of uplink transmit sub-beams based on the random access response. The apparatus 1002/1002' also includes means for obtaining one or more measurements of each of the plurality of uplink transmit sub-beams by a beam sweep operation with the plurality of receive beams. The apparatus 1002/1002' also includes means for selecting one of the plurality of uplink transmit sub-beams based on the one or more measurements. The apparatus 1002/1002' also includes means for transmitting, to the UE, a downlink control signal that includes an SRS resource indicator (SRI) that indicates the selected one of the plurality of uplink transmit sub-beams that is associated with a corresponding SRS transmission in the plurality of SRS transmissions. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following clauses are illustrative only and may be combined with aspects of other implementations or teachings described herein, without limitation.

Aspect 1 is a method of wireless communication at a user equipment (UE) that includes transmitting, to a base station via a transmit beam over a random access channel, a random access preamble; receiving, from the base station over the random access channel, a random access response based on the random access preamble; transmitting, to the base station via a plurality of transmit sub-beams, a plurality of sounding reference signal (SRS) transmissions based on the random access response; receiving, from the base station, a downlink control signal that includes an SRS resource indicator (SRI) that indicates a selected transmit sub-beam in the plurality of transmit sub-beams that is associated with a corresponding SRS transmission in the plurality of SRS transmissions; determining quasi co-location (QCL) information from the SRI, the QCL information indicating that downlink signaling of the base station is quasi co-located with the corresponding SRS transmission; and receiving, from the base station via a refined receive sub-beam, the downlink signaling based on the QCL information, the refined receive sub-beam corresponding to the selected transmit sub-beam.

In Aspect 2, the method of Aspect 1 further includes that each of the plurality of SRS transmissions comprises a same SRS transmission with a different spatial filter.

In Aspect 3, the method of Aspect 1 or Aspect 2 further includes that the communicating the plurality of SRS transmissions comprises transmitting, to the base station, each of the plurality of SRS transmissions with a different spatial filter within a beam width of the transmit beam.

In Aspect 4, the method of any of Aspects 1-3 further includes that the communicating the plurality of SRS transmissions comprises transmitting, to the base station via respective ones of the plurality of transmit sub-beams, each of the plurality of SRS transmissions on a different symbol within a same slot.

In Aspect 5, the method of any of Aspects 1-4 further includes that the transmitting comprises transmitting the plurality of SRS transmissions on different orthogonal frequency-division multiplexing (OFDM) symbols with different spatial filters.

In Aspect 6, the method of any of Aspects 1-5 further includes receiving, from the base station over a physical broadcast channel, a plurality of synchronization signal blocks (SSBs) via respective ones of a plurality of receive beams; obtaining one or more measurements of each of the plurality of SSBs by a beam sweep operation with the plurality of receive beams; and determining a beam pair indicating a pairing between one of the plurality of SSBs and one of the plurality of receive beams based on the one or more measurements.

In Aspect 7, the method of any of Aspects 1-6 further includes selecting a first receive beam of the plurality of receive beams based on the one or more measurements, wherein the first receive beam corresponds to a downlink transmit beam carrying a first synchronization signal block (SSB) of the plurality of SSBs.

In Aspect 8, the method of any of Aspects 1-7 further includes that the communicating the random access preamble comprises transmitting, to the base station, a random access message 1 via the transmit beam having a first beam width that corresponds to a second beam width of the one of the plurality of receive beams.

In Aspect 9, the method of any of Aspects 1-8 further includes that the plurality of transmit sub-beams have respective beam widths that cover at least in part a beam width of the transmit beam, each of the respective beams widths of the plurality of transmit sub-beams is smaller than the beam width of the transmit beam.

In Aspect 10, the method of any of Aspects 1-9 further includes that the random access preamble corresponds to a random access channel (RACH) message 1 and the random access response corresponds to a RACH Msg 2, further comprising transmitting, to the base station, a RACH Msg 3 with a beam width that corresponds to the selected transmit sub-beam in response to the RACH Msg 2.

In Aspect 11, the method of any of Aspects 1-10 further includes that the RACH Msg 2 comprises an indication to transmit the plurality of SRS transmissions in a slot different than transmission of the RACH Msg 3, and the indication includes a parameter indicating separation between the plurality of SRS transmissions and the RACH Msg 3 by a predetermined number of slots.

In Aspect 12, the method of any of Aspects 1-11 further includes that the communicating the plurality of SRS transmissions comprises transmitting, to the base station, the plurality of SRS transmissions prior to transmission of the RACH Msg 3.

In Aspect 13, the method of any of Aspects 1-11 further includes that the communicating the plurality of SRS transmissions comprises transmitting, to the base station, the plurality of SRS transmissions in a same slot as the RACH Msg 3, the RACH Msg 2 comprises an indication to transmit the plurality of SRS transmissions in the same slot as the RACH Msg 3.

In Aspect 14, the method of any of Aspects 1-13 further includes that the receiving the RACH Msg 2 comprises detecting a trigger signal in the RACH Msg 2, and
the communicating the plurality of SRS transmissions comprises transmitting, to the base station, the plurality of SRS transmissions in response to the detecting of the trigger signal.

In Aspect 15, the method of any of Aspects 1-14 further includes that the receiving the random access response comprises receiving a trigger signal in a physical downlink control channel (PDCCH) of the RACH Msg 2, the trigger signal comprising an indication to the UE to transmit the plurality of SRS transmissions, and the PDCCH of the RACH Msg 2 further indicates a number of SRS symbols to utilize for the plurality of SRS transmissions, wherein each of the plurality of SRS transmissions is transmitted on a respective SRS symbol.

In Aspect 16, the method of any of Aspects 1-15 further includes receiving, from the base station, a RACH Msg 4 at a slot that is subsequent to transmission of the RACH Msg 3, wherein the downlink control signal is included in a physical downlink control channel (PDCCH) of the RACH Msg 4 and the downlink signaling is included in a physical downlink shared channel (PDSCH) of the RACH Msg 4, and wherein the RACH Msg 4 is quasi co-located with one of the plurality of SRS transmissions with respect to spatial reception parameters.

In Aspect 17, the method of any of Aspects 1-16 further includes that the RACH Msg 2 includes an indication of a scaling factor to the UE to produce each of the plurality of transmit sub-beams as a predetermined fraction of a beam width of the transmit beam.

In Aspect 18, the method of any of Aspects 1-17 further includes that the QCL information indicates one of a plurality of QCL types.

In Aspect 19, the method of any of Aspects 1-18 further includes that the one of the plurality of QCL types corresponds to QCL Type D.

In Aspect 20, the method of any of Aspects 1-19 further includes that the receiving the downlink signaling comprises receiving a physical downlink shared channel (PDSCH) or a physical downlink control channel (PDCCH) with the refined receive beam on a resource that corresponds to the SRI.

In Aspect 21, the method of any of Aspects 1-20 further includes that the receiving the random access response comprises receiving, from the base station, an indication of a trigger condition associated with the random access preamble, and the communicating the plurality of SRS transmissions comprises transmitting the plurality of SRS transmissions when the trigger condition indicates that reception of the random access preamble at the base station is not satisfied.

In Aspect 22, the method of any of Aspects 1-21 further includes selecting the refined receive sub-beam from a plurality of receive sub-beams based on the selected transmit sub-beam.

Aspect 23 is a device including one or more processors and one or more memories in electronic communication with the one or more processors storing instructions executable by the one or more processors to cause a system or an apparatus to implement a method as in any of Aspects 1 to 22.

Aspect 24 is a system or apparatus including means for implementing a method or realizing an apparatus as in any of Aspects 1 to 22.

Aspect 25 is a non-transitory computer-readable medium storing instructions executable by one or more processors to cause the one or more processors to implement a method as in any of Aspects 1 to 22.

Aspect 26 is an apparatus for wireless communication at a user equipment (UE) that includes at least one processor; and a memory communicatively coupled with the at least one processor and storing processor-readable code that, when executed by the at least one processor, causes the apparatus to: communicate, with a base station via a transmit beam over a random access channel, a random access preamble; receive, from the base station over the random access channel, a random access response based on the random access preamble; communicate, with the base station via a plurality of transmit sub-beams, a plurality of sounding reference signal (SRS) transmissions based on the random access response; receive, from the base station, a downlink control signal that includes an SRS resource indicator (SRI) that indicates a selected transmit sub-beam in the plurality of transmit sub-beams that is associated with a corresponding SRS transmission in the plurality of SRS transmissions; determine quasi co-location (QCL) information from the SRI, the QCL information indicating that downlink signaling of the base station is quasi co-located with the corresponding SRS transmission; and receive, from the base station via a refined receive sub-beam, the downlink signaling based on the QCL information, the refined receive sub-beam corresponding to the selected transmit sub-beam.

In Aspect 27, the apparatus of Aspect 26 further includes that the communication of the plurality of SRS transmissions comprises to transmit, to the base station via respective ones of the plurality of transmit sub-beams, each of the plurality of SRS transmissions on a different symbol within a same slot, and wherein the transmission of each of the plurality of SRS transmissions comprises to transmit the plurality of SRS transmissions on different orthogonal frequency-division multiplexing (OFDM) symbols with different spatial filters.

Aspect 28 is a device including one or more processors and one or more memories in electronic communication with the one or more processors storing instructions executable by the one or more processors to cause a system or an apparatus to implement a method as in any of Aspects 26 to 27.

Aspect 29 is a system or apparatus including means for implementing a method or realizing an apparatus as in any of Aspects 26 to 27.

Aspect 30 is a non-transitory computer-readable medium storing instructions executable by one or more processors to cause the one or more processors to implement a method as in any of Aspects 26 to 27.

Aspect 31 is a method of wireless communication at a base station that includes receiving, from a user equipment (UE) via an uplink transmit beam over a random access channel, a random access preamble; transmitting, to the UE over the random access channel, a random access response; receiving, from the UE via a plurality of receive beams, a plurality of sounding reference signal (SRS) transmissions on a plurality of uplink transmit sub-beams based on the random access response; obtaining one or more measurements of each of the plurality of uplink transmit sub-beams by a beam sweep operation with the plurality of receive beams; selecting one of the plurality of uplink transmit sub-beams based on the one or more measurements; and transmitting, to the UE, a downlink control signal that includes an SRS resource indicator (SRI) that indicates the selected one of the plurality of uplink transmit sub-beams that is associated with a corresponding SRS transmission in the plurality of SRS transmissions.

In Aspect 32, the method of Aspect 31 further includes selecting one of the plurality of receive beams as a refined receive beam based on the one or more measurements of the plurality of uplink transmit sub-beams, wherein the refined receive beam corresponds to the selected one of the plurality of uplink transmit sub-beams that is indicated by the SRI; and receiving, from the UE via the refined receive beam, an uplink data signal.

In Aspect 33, the method of Aspect 31 or Aspect 32 further includes that the receiving the plurality of SRS transmissions comprises receiving, from the UE, each of the plurality of SRS transmissions having a different spatial filter within a beam width of the uplink transmit beam.

In Aspect 34, the method of any of Aspects 31-33 further includes that the receiving the plurality of SRS transmissions comprises receiving, from the UE on respective ones of the plurality of uplink transmit sub-beams, each of the plurality of SRS transmissions having a different spatial filter on a different symbol within a same slot.

Aspect 35 is a device including one or more processors and one or more memories in electronic communication with the one or more processors storing instructions executable by the one or more processors to cause a system or an apparatus to implement a method as in any of Aspects 31 to 34.

Aspect 36 is a system or apparatus including means for implementing a method or realizing an apparatus as in any of Aspects 31 to 34.

Aspect 37 is a non-transitory computer-readable medium storing instructions executable by one or more processors to cause the one or more processors to implement a method as in any of Aspects 31 to 34.

Aspect 38 is an apparatus for wireless communication at a user equipment (UE) that includes at least one processor; and a memory communicatively coupled with the at least one processor and storing processor-readable code that, when executed by the at least one processor, causes the apparatus to: receive, from a user equipment (UE) via an uplink transmit beam over a random access channel, a random access preamble; communicate, with the UE over the random access channel, a random access response; receive, from the UE via a plurality of receive beams, a plurality of sounding reference signal (SRS) transmissions on a plurality of uplink transmit sub-beams based on the random access response; obtain one or more measurements of each of the plurality of uplink transmit sub-beams by a beam sweep operation with the plurality of receive beams; select one of the plurality of uplink transmit sub-beams based on the one or more measurements; and communicate, with the UE, a downlink control signal that includes an SRS resource indicator (SRI) that indicates the selected one of the plurality of uplink transmit sub-beams that is associated with a corresponding SRS transmission in the plurality of SRS transmissions.

In Aspect 39, the method of Aspect 38 further includes that the code further causes the apparatus to select one of the plurality of receive beams as a refined receive beam based on the one or more measurements of the plurality of uplink transmit sub-beams, wherein the refined receive beam corresponds to the selected one of the plurality of uplink transmit sub-beams that is indicated by the SRI; and receive, from the UE via the refined receive beam, an uplink data signal.

Aspect 40 is a device including one or more processors and one or more memories in electronic communication with the one or more processors storing instructions executable by the one or more processors to cause a system or an apparatus to implement a method as in any of Aspects 38 to 39.

Aspect 41 is a system or apparatus including means for implementing a method or realizing an apparatus as in any of Aspects 38 to 39.

Aspect 42 is a non-transitory computer-readable medium storing instructions executable by one or more processors to cause the one or more processors to implement a method as in any of Aspects 38 to 39.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more.". Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration.". Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means.". As such, no claim element is to be construed as a means plus function unless the element is expressly recited using the phrase "means for.".

What is claimed is:

1. A method of wireless communication at a user equipment (UE), the method comprising:
   transmitting, to a base station via a transmit beam over a random access channel, a random access preamble;
   receiving, from the base station over the random access channel, a random access response based on the random access preamble;
   transmitting, to the base station via a plurality of transmit sub-beams, a plurality of sounding reference signal (SRS) transmissions based on the random access response;
   receiving, from the base station, a downlink control signal that includes an SRS resource indicator (SRI) that indicates a selected transmit sub-beam in the plurality of transmit sub-beams that is associated with a corresponding SRS transmission in the plurality of SRS transmissions; and
   receiving downlink signaling from the base station via a refined receive sub-beam based on quasi co-location (QCL) information corresponding to the SRI, the refined receive sub-beam corresponding to the selected transmit sub-beam.

2. The method of claim 1, wherein each of the plurality of SRS transmissions comprises a same SRS transmission with a different spatial filter.

3. The method of claim 1, wherein the communicating the plurality of SRS transmissions comprises transmitting, to the base station, each of the plurality of SRS transmissions with a different spatial filter within a beam width of the transmit beam.

4. The method of claim 1, wherein the communicating the plurality of SRS transmissions comprises transmitting, to the base station via respective ones of the plurality of transmit sub-beams, each of the plurality of SRS transmissions on a different symbol within a same slot.

5. The method of claim 4, wherein the transmitting the plurality of SRS transmissions comprises transmitting the plurality of SRS transmissions on different orthogonal frequency-division multiplexing (OFDM) symbols with different spatial filters.

6. The method of claim 1, further comprising:
   receiving, from the base station over a physical broadcast channel, a plurality of synchronization signal blocks (SSBs) via respective ones of a plurality of receive beams;
   obtaining one or more measurements of each of the plurality of SSBs by a beam sweep operation with the plurality of receive beams; and
   determining a beam pair indicating a pairing between one of the plurality of SSBs and one of the plurality of receive beams based on the one or more measurements.

7. The method of claim 6, further comprising:
   selecting a first receive beam of the plurality of receive beams based on the one or more measurements, wherein the first receive beam corresponds to a downlink transmit beam carrying a first synchronization signal block (SSB) of the plurality of SSBs.

8. The method of claim 6, wherein the transmitting the random access preamble comprises transmitting, to the base station, a random access message 1 via the transmit beam having a first beam width that corresponds to a second beam width of the one of the plurality of receive beams.

9. The method of claim 1, wherein:
   the plurality of transmit sub-beams have respective beam widths that cover at least in part a beam width of the transmit beam, and
   each of the respective beams widths of the plurality of transmit sub-beams is smaller than the beam width of the transmit beam.

10. The method of claim 1, wherein the random access preamble corresponds to a random access channel (RACH) message 1 and the random access response corresponds to a RACH message 2, and
   further comprising transmitting, to the base station, a RACH message 3 with a beam width that corresponds to the selected transmit sub-beam in response to the RACH message 2.

11. The method of claim 10, wherein:
   the RACH message 2 comprises an indication to transmit the plurality of SRS transmissions in a slot different than transmission of the RACH message 3, and
   the indication includes a parameter indicating separation between the plurality of SRS transmissions and the RACH message 3 by a predetermined number of slots.

12. The method of claim 11, wherein the transmitting the plurality of SRS transmissions comprises transmitting, to the base station, the plurality of SRS transmissions prior to transmission of the RACH message 3.

13. The method of claim 10, wherein:
   the transmitting the plurality of SRS transmissions comprises transmitting, to the base station, the plurality of SRS transmissions in a same slot as the RACH message 3, and the RACH message 2 comprises an indication to transmit the plurality of SRS transmissions in the same slot as the RACH message 3.

14. The method of claim 10, wherein:
the receiving the RACH message 2 comprises detecting a trigger signal in the RACH message 2, and
the transmitting the plurality of SRS transmissions comprises transmitting, to the base station, the plurality of SRS transmissions in response to the detecting of the trigger signal.

15. The method of claim 10, wherein:
the receiving the random access response comprises receiving a trigger signal in a physical downlink control channel (PDCCH) of the RACH message 2, the trigger signal comprising an indication to the UE to transmit the plurality of SRS transmissions, and
the PDCCH of the RACH message 2 further indicates a number of SRS symbols to utilize for the plurality of SRS transmissions, wherein each of the plurality of SRS transmissions is transmitted on a respective SRS symbol.

16. The method of claim 10, further comprising receiving, from the base station, a RACH message 4 at a slot that is subsequent to transmission of the RACH message 3,
wherein the downlink control signal is included in a physical downlink control channel (PDCCH) of the RACH message 4 and the downlink signaling is included in a physical downlink shared channel (PDSCH) of the RACH message 4, and
wherein the RACH message 4 is quasi co-located with one of the plurality of SRS transmissions with respect to spatial reception parameters.

17. The method of claim 10, wherein the RACH message 2 includes an indication of a scaling factor to the UE to produce each of the plurality of transmit sub-beams as a predetermined fraction of a beam width of the transmit beam.

18. The method of claim 1, further comprising determining the QCL information from the SRI, the QCL information indicating that downlink signaling of the base station is quasi co-located with the corresponding SRS transmission, wherein the QCL information indicates one of a plurality of QCL types, wherein the one of the plurality of QCL types corresponds to QCL Type D.

19. The method of claim 1, wherein the receiving the downlink signaling comprises receiving a physical downlink shared channel (PDSCH) or a physical downlink control channel (PDCCH) with the refined receive beam on a resource that corresponds to the SRI.

20. The method of claim 1, wherein:
the receiving the random access response comprises receiving, from the base station, an indication of a trigger condition associated with the random access preamble, and
the transmitting the plurality of SRS transmissions comprises transmitting the plurality of SRS transmissions when the trigger condition indicates that reception of the random access preamble at the base station is not satisfied.

21. The method of claim 1, further comprising selecting the refined receive sub-beam from a plurality of receive sub-beams based on the selected transmit sub-beam.

22. An apparatus for wireless communication at a user equipment (UE), the apparatus comprising:
at least one processor; and
a memory communicatively coupled with the at least one processor and storing processor-readable code that, when executed by the at least one processor, causes the apparatus to:
communicate, with a base station via a transmit beam over a random access channel, a random access preamble;
receive, from the base station over the random access channel, a random access response based on the random access preamble;
communicate, with the base station via a plurality of transmit sub-beams, a plurality of sounding reference signal (SRS) transmissions based on the random access response;
receive, from the base station, a downlink control signal that includes an SRS resource indicator (SRI) that indicates a selected transmit sub-beam in the plurality of transmit sub-beams that is associated with a corresponding SRS transmission in the plurality of SRS transmissions; and
receive downlink signaling from the base station via a refined receive sub-beam based on quasi co-location (QCL) information, the refined receive sub-beam corresponding to the selected transmit sub-beam.

23. The apparatus of claim 22, wherein the communication of the plurality of SRS transmissions comprises to transmit, to the base station via respective ones of the plurality of transmit sub-beams, each of the plurality of SRS transmissions on a different symbol within a same slot, and wherein the transmission of each of the plurality of SRS transmissions comprises to transmit the plurality of SRS transmissions on different orthogonal frequency-division multiplexing (OFDM) symbols with different spatial filters.

24. The apparatus of claim 23, wherein the code further causes the apparatus to determine the QCL information from the SRI, the QCL information indicating that downlink signaling of the base station is quasi co-located with the corresponding SRS transmission.

25. A method of wireless communication at a base station, the method comprising:
receiving, from a user equipment (UE) via an uplink transmit beam over a random access channel, a random access preamble;
transmitting, to the UE over the random access channel, a random access response;
receiving, from the UE via a plurality of receive beams, a plurality of sounding reference signal (SRS) transmissions on a plurality of uplink transmit sub-beams based on the random access response;
obtaining one or more measurements of each of the plurality of uplink transmit sub-beams by a beam sweep operation with the plurality of receive beams;
selecting one of the plurality of uplink transmit sub-beams based on the one or more measurements; and
transmitting, to the UE, a downlink control signal that includes an SRS resource indicator (SRI) that indicates the selected one of the plurality of uplink transmit sub-beams that is associated with a corresponding SRS transmission in the plurality of SRS transmissions.

26. The method of claim 25, further comprising:
selecting one of the plurality of receive beams as a refined receive beam based on the one or more measurements of the plurality of uplink transmit sub-beams, wherein the refined receive beam corresponds to the selected one of the plurality of uplink transmit sub-beams that is indicated by the SRI; and receiving, from the UE via the refined receive beam, an uplink data signal.

27. The method of claim 25, wherein the receiving the plurality of SRS transmissions comprises receiving, from the UE, each of the plurality of SRS transmissions having a different spatial filter within a beam width of the uplink transmit beam.

28. The method of claim 25, wherein the receiving the plurality of SRS transmissions comprises receiving, from the UE on respective ones of the plurality of uplink transmit sub-beams, each of the plurality of SRS transmissions having a different spatial filter on a different symbol within a same slot.

29. An apparatus for wireless communication at a base station, the apparatus comprising:
    at least one processor; and
    a memory communicatively coupled with the at least one processor and storing processor-readable code that, when executed by the at least one processor, causes the apparatus to:
        receive, from a user equipment (UE) via an uplink transmit beam over a random access channel, a random access preamble;
        communicate, with the UE over the random access channel, a random access response;
        receive, from the UE via a plurality of receive beams, a plurality of sounding reference signal (SRS) transmissions on a plurality of uplink transmit sub-beams based on the random access response;
        obtain one or more measurements of each of the plurality of uplink transmit sub-beams by a beam sweep operation with the plurality of receive beams;
        select one of the plurality of uplink transmit sub-beams based on the one or more measurements; and
        communicate, with the UE, a downlink control signal that includes an SRS resource indicator (SRI) that indicates the selected one of the plurality of uplink transmit sub-beams that is associated with a corresponding SRS transmission in the plurality of SRS transmissions.

30. The apparatus of claim 29, wherein the code further causes the apparatus to:
    select one of the plurality of receive beams as a refined receive beam based on the one or more measurements of the plurality of uplink transmit sub-beams, wherein the refined receive beam corresponds to the selected one of the plurality of uplink transmit sub-beams that is indicated by the SRI; and
    receive, from the UE via the refined receive beam, an uplink data signal.

\* \* \* \* \*